(12) United States Patent
Kim et al.

(10) Patent No.: US 10,623,845 B1
(45) Date of Patent: Apr. 14, 2020

(54) ACOUSTIC GESTURE DETECTION FOR CONTROL OF A HEARABLE DEVICE

(71) Applicant: QUALCOMM Incorporated, San Diego, CA (US)

(72) Inventors: Lae-Hoon Kim, San Diego, CA (US); Dongmei Wang, San Diego, CA (US); Fatemeh Saki, San Diego, CA (US); Erik Visser, San Diego, CA (US); Anne Katrin Konertz, Encinitas, CA (US); Sharon Kaziunas, Bangor, PA (US); Shuhua Zhang, San Diego, CA (US); Cheng-Yu Hung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/222,995

(22) Filed: Dec. 17, 2018

(51) Int. Cl.
*H04R 1/10* (2006.01)
*G06F 3/01* (2006.01)

(52) U.S. Cl.
CPC .......... *H04R 1/1041* (2013.01); *G06F 3/017* (2013.01); *H04R 2430/01* (2013.01)

(58) Field of Classification Search
CPC .... H04R 1/1041; H04R 2430/01; G06F 3/017
See application file for complete search history.

(56) References Cited

U.S. PATENT DOCUMENTS

| | | | | |
|---|---|---|---|---|
| 2007/0113207 | A1* | 5/2007 | Gritton | G06F 3/017 715/863 |
| 2009/0157206 | A1* | 6/2009 | Weinberg | G06F 3/017 700/94 |
| 2009/0209293 | A1* | 8/2009 | Louch | H04M 1/6041 455/566 |
| 2009/0274317 | A1 | 11/2009 | Kahn et al. | |
| 2010/0074460 | A1 | 3/2010 | Marzetta | |
| 2012/0057733 | A1* | 3/2012 | Morii | H04R 25/407 381/313 |
| 2012/0197420 | A1 | 8/2012 | Kumakura et al. | |
| 2013/0119255 | A1* | 5/2013 | Dickinson | G04G 21/00 250/340 |
| 2015/0230026 | A1* | 8/2015 | Eichfeld | H04R 5/027 381/26 |

FOREIGN PATENT DOCUMENTS

| | | |
|---|---|---|
| CN | 107708008 A | 2/2018 |
| EP | 2426951 A1 | 3/2012 |
| WO | 2016027932 A1 | 2/2016 |

OTHER PUBLICATIONS

International Search Report and Written Opinion—PCT/US2019/066080—ISA/EPO—dated Feb. 13, 2020.

* cited by examiner

*Primary Examiner* — Mark Fischer
(74) *Attorney, Agent, or Firm* — Kilpatrick Townsend & Stockton/QUALCOMM Incorporated

(57) ABSTRACT

Methods, systems, computer-readable media, and apparatuses for gesture control are presented. One example includes indicating, based on information from a first audio input signal, a presence of an object in proximity to a microphone, and increasing a volume level in response to the indicating.

21 Claims, 17 Drawing Sheets

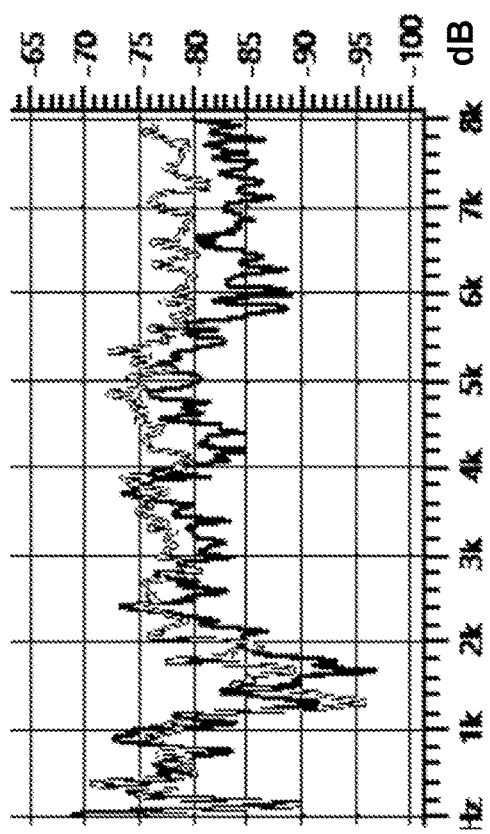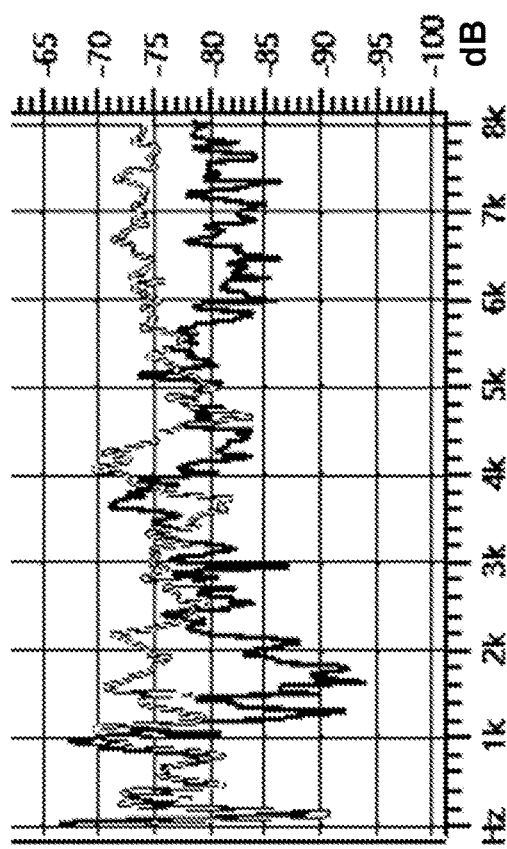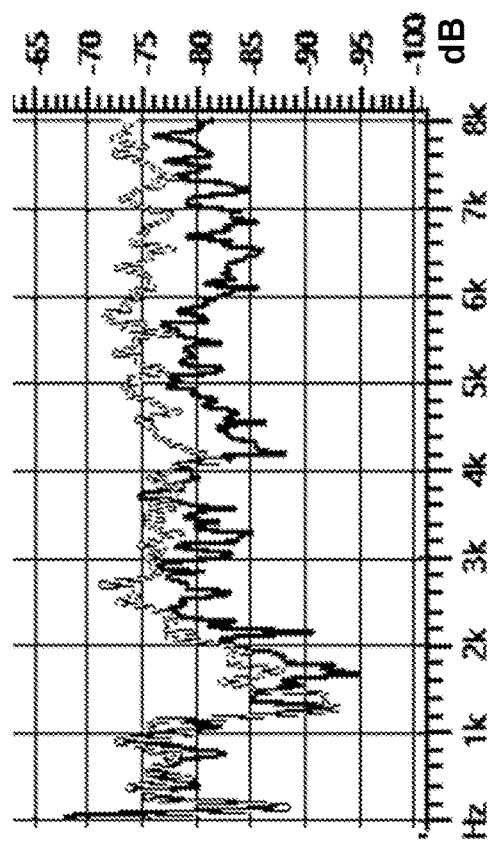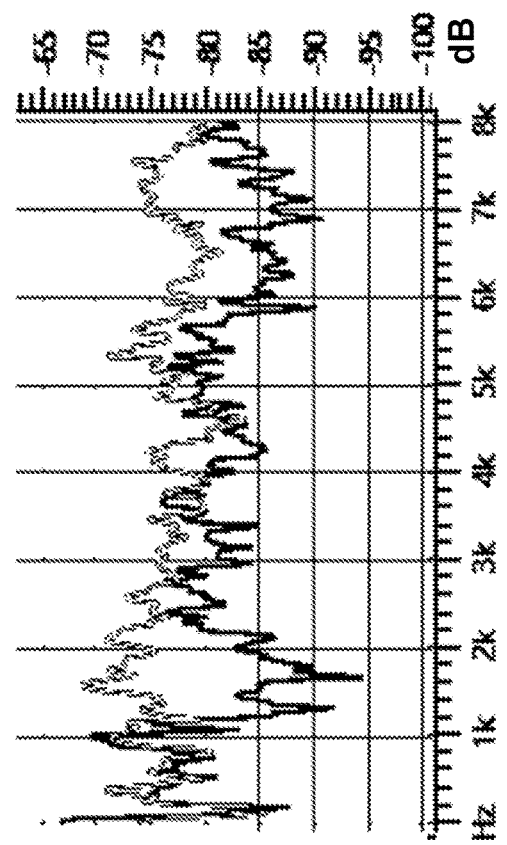
FIG. 4A
FIG. 4B

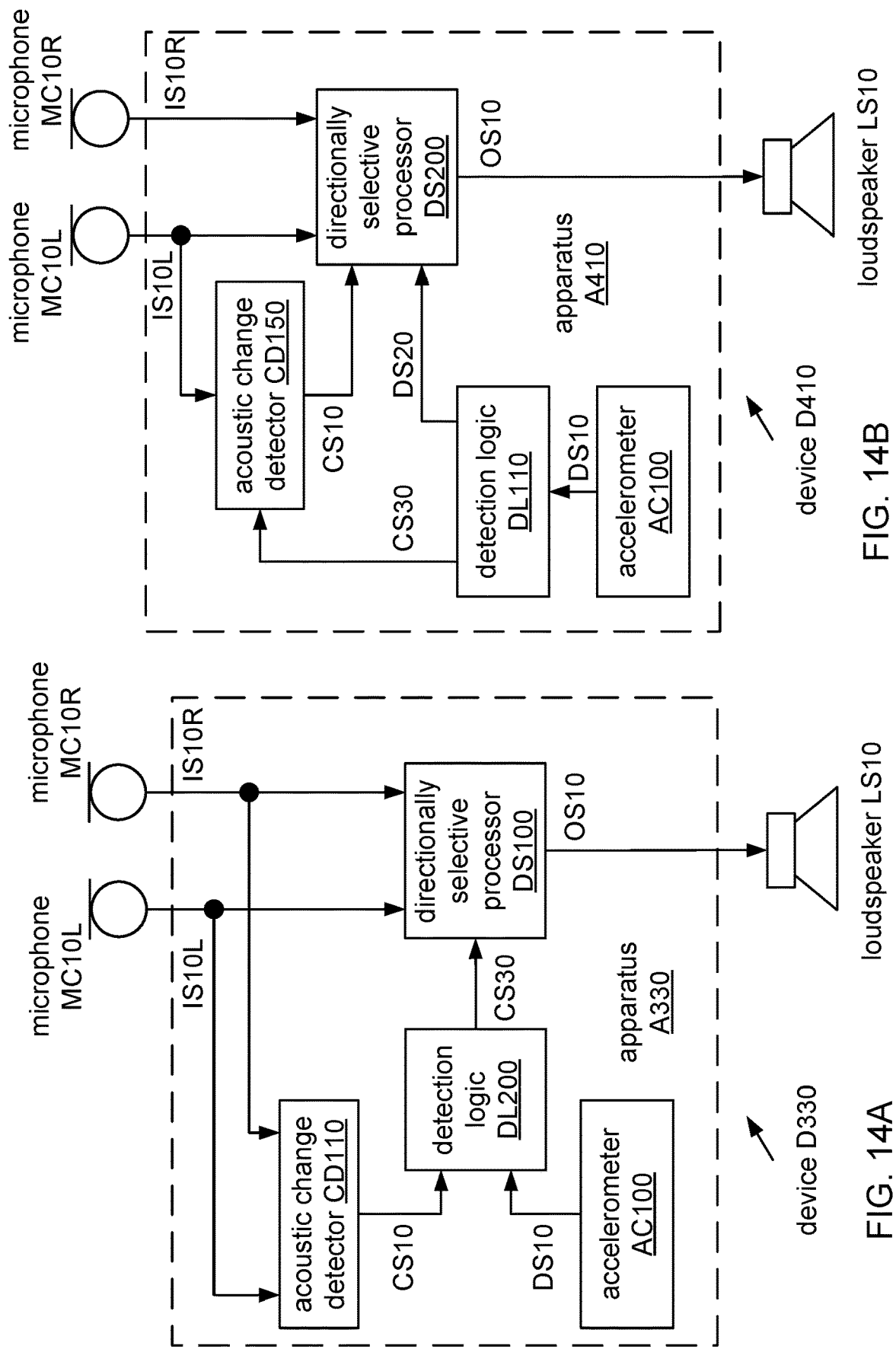

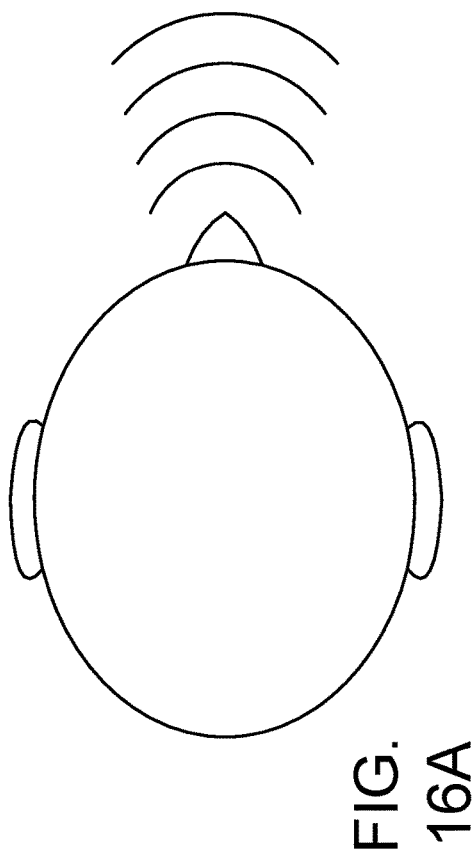
FIG. 16A
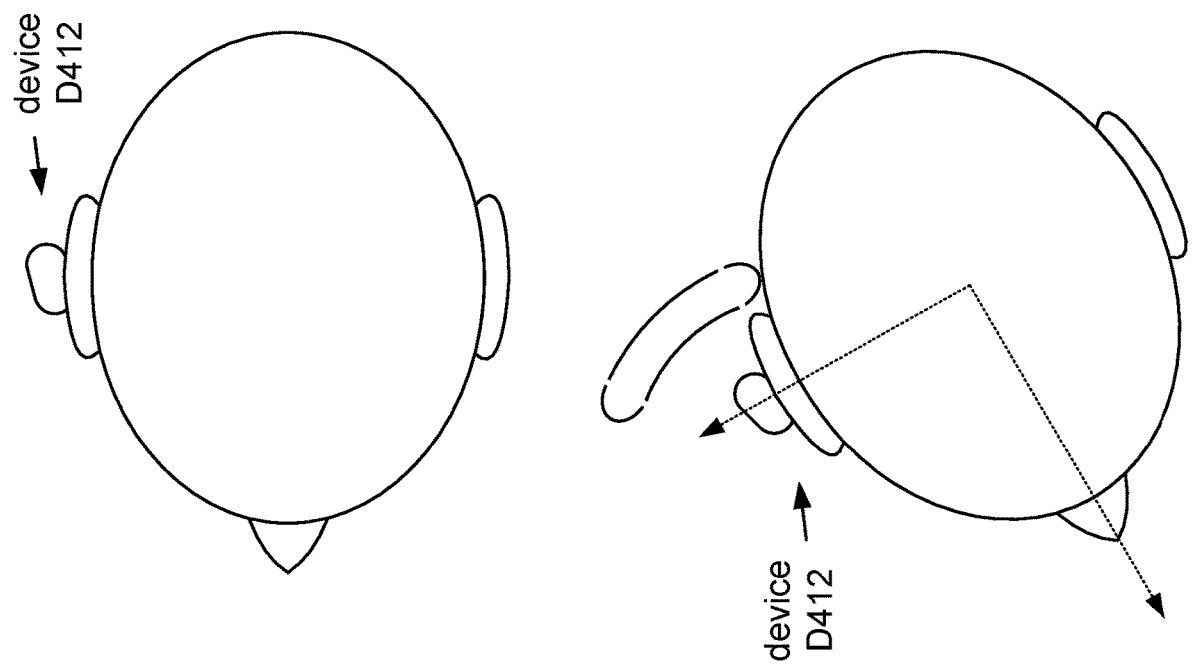
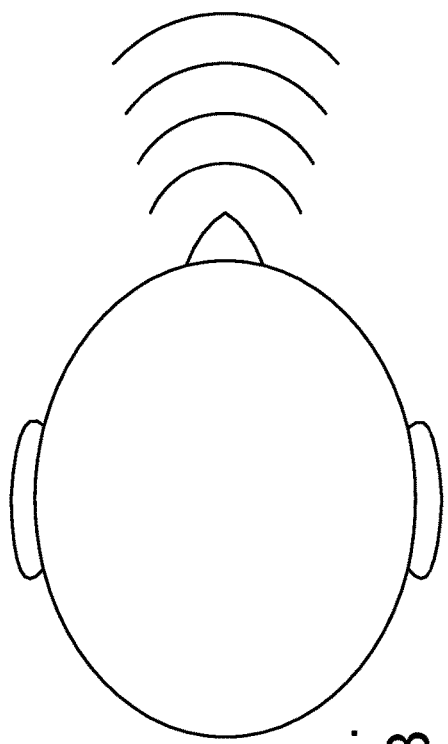
FIG. 16B

ACOUSTIC GESTURE DETECTION FOR CONTROL OF A HEARABLE DEVICE

FIELD OF THE DISCLOSURE

Aspects of the disclosure relate to acoustic gesture detection.

BACKGROUND

Hearable devices or "hearables" (also known as "smart headphones," "smart earphones," or "smart earpieces") are becoming increasingly popular. Such devices, which are designed to be worn over the ear or in the ear, have been used for multiple purposes, including wireless transmission and fitness tracking. As shown in FIG. 1A, the hardware architecture of a hearable typically includes a loudspeaker to reproduce sound to a user's ear; a microphone to sense the user's voice and/or ambient sound; and signal processing circuitry to communicate with another device (e.g., a smartphone). A hearable may also include one or more sensors: for example, to track heart rate, to track physical activity (e.g., body motion), or to detect proximity.

BRIEF SUMMARY

A method of gesture control according to a general configuration includes determining, based on information from a first audio input signal, that a user has made a predetermined hand gesture; and in response to the determining, increasing, relative to a total energy of a source signal that is based on the first audio input signal, an energy of a desired sound component of the source signal. In this method, the first audio input signal is based on information from a first microphone signal that is produced by a microphone worn at an ear of the user. A method of gesture control of volume level according to another general configuration includes receiving a first audio input signal that is based on an output signal of a first microphone; indicating, based on at least a change in a spectrum of the first audio input signal, a presence of an object in proximity to the first microphone; and in response to the indicating, increasing a volume level. Computer-readable storage media comprising code which, when executed by at least one processor, causes the at least one processor to perform such a method are also disclosed.

An apparatus for gesture control according to a general configuration includes an acoustic change detector configured to indicate, based on information from a first audio input signal, that a user has made a predetermined hand gesture; and a signal enhancer configured to increase, relative to a total energy of a source signal that is based on the first audio input signal, and in response to the indicating, an energy of a desired sound component of the source signal. In this apparatus, the first audio input signal is based on information from a first microphone signal that is produced by a microphone worn at an ear of the user. An wearable for gesture control of volume level according to another general configuration includes a memory configured to store computer-executable instructions and a processor coupled to the memory and configured to execute the computer-executable instructions to: receive a first audio input signal that is based on an output signal of a first microphone; indicate, based on at least a change in a spectrum of the first audio input signal, a presence of an object in proximity to the first microphone; and in response to the indicating, increase a volume level of the wearable. Apparatus comprising a memory configured to store computer-executable instructions and a processor coupled to the memory and configured to execute the computer-executable instructions to perform such operations (e.g., indicating, increasing, receiving) are also disclosed.

BRIEF DESCRIPTION OF THE DRAWINGS

Aspects of the disclosure are illustrated by way of example. In the accompanying figures, like reference numbers indicate similar elements.

FIGS. 4A and 4B show two examples of a change in spectrum caused by a user covering her right ear.

FIG. 14A shows a block diagram of an implementation D330 of device D300 that includes an implementation A330 of apparatus A300.

FIG. 14B shows a block diagram of an implementation D410 of device D210 that includes an implementation A410 of apparatus A210.

FIGS. 16A and 16B show an example of a user of an implementation D412 of device D410 or D430 having difficulty hearing a speaker who the user is facing.

DETAILED DESCRIPTION

Figure 1B:
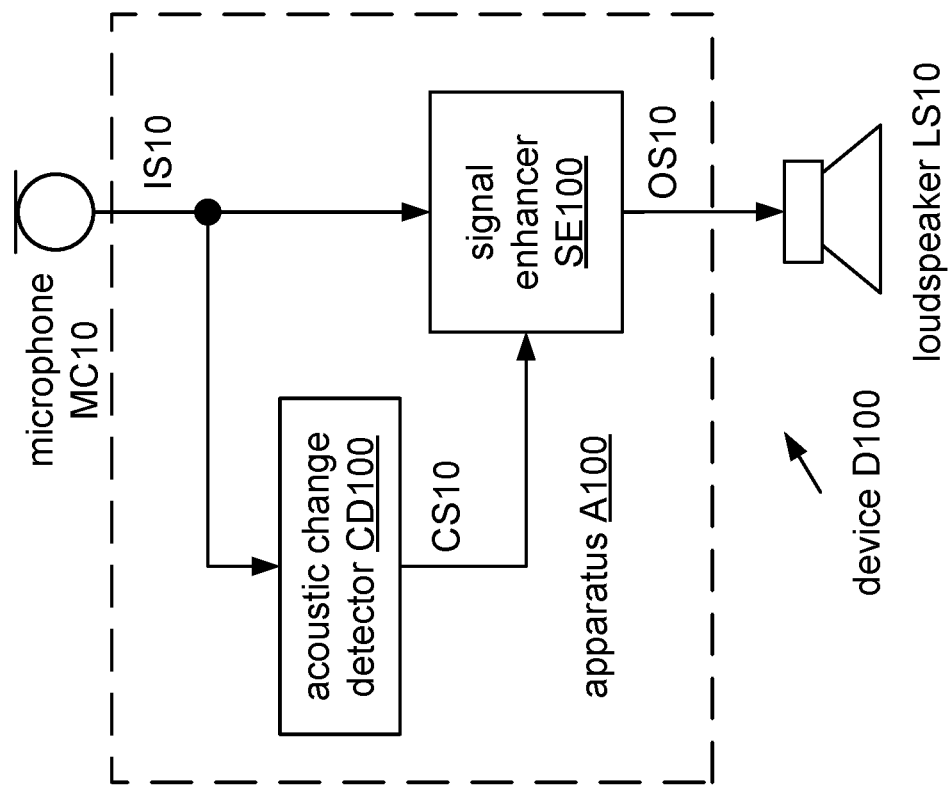
FIG. 1B shows a block diagram of a device D100 that includes an apparatus A100 according to a general configuration.
Figure 1A:
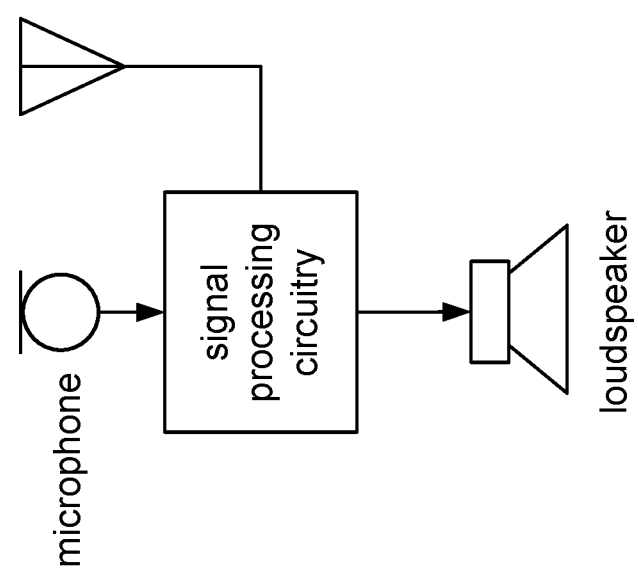
FIG. 1A shows a block diagram of a hearable.

Methods, apparatus, and systems as disclosed herein include implementations that may be used to provide an easy and robust methodology for using user input to control a hearable directly without relying on a user interface of another device (such as a smartphone). Such techniques may be used, for example, to overcome the difficulty that the power consumption constraint of a hearable typically limits the number of sensors the hearable may contain.

It may be desirable to achieve control of a device with very limited sensor availability (e.g., only microphones), such as a hearable, by recognizing a gesture as user input. As one particular example, recognition of a typical action of placing a hand near an ear, and using such recognition to enable a desired action with the system (e.g., to enhance an acoustic signal), are disclosed. This principle is generalized to other gestures, and it can also be extended with availability of additional sensors and/or a wireless channel as well as the natural acoustic channel.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

FIG. 1B shows a block diagram of a device D100 that includes an apparatus A100 according to a general configuration. Apparatus A100 includes an acoustic change detector CD100 configured to indicate, based on information from a first audio input signal IS10, a presence of an object in proximity to a microphone (e.g., by changing a logical state of control signal CS10). The object may be, for example, a hand of a user of the device in a predetermined hand gesture. The first audio input signal IS10 is based on information from a first microphone signal that is produced by a microphone worn at an ear of the user. In the example of FIG. 1B, device D100 also includes a microphone MC10 that produces the first microphone signal. Apparatus A100 and/or device D100 may be configured to obtain first audio input signal IS10 by performing one or more preprocessing operations (not shown) on a signal that is produced by microphone MC10 in response to acoustic vibrations, such as any of analog-to-digital conversion, equalization, level control, etc. A processor of apparatus A100 may be configured to receive first audio input signal IS10 from a memory (e.g., a buffer) of the device.

Apparatus A100 also includes a signal enhancer SE100 configured to increase a volume level of a signal that is based on the first microphone signal (e.g., a relative volume level of a desired component of the signal). For example, signal enhancer SE100 may be configured to produce, in response to the indicating, an output signal containing a desired sound component of the first audio input signal such that an energy of the desired sound component in the output signal, relative to a total energy of the output signal, is greater than an energy of the desired sound component in the first audio input signal, relative to a total energy of the first audio input signal. In one example, signal enhancer SE100 is configured to suppress ambient noise in the first audio input signal using a stationary noise reference (e.g., a steady-state average of the first audio input signal, as measured in a frequency domain over one or more intervals during which identified transient sources, such as the speaker's voice, are inactive). In another example, signal enhancer SE100 is implemented as a separation network configured to separate the desired sound component from both stationary and non-stationary noise. In the example of FIG. 1B, device D100 includes a loudspeaker configured to reproduce a signal that is based on the output signal OS10 produced by signal enhancer SE100.

Examples of use cases for apparatus A100 and/or device D100 include a bar, cafeteria, or other space in which the ambient noise is too loud to allow a user to hear nearby friends well enough to carry on a normal conversation. It may be desirable to use the apparatus and/or device to decrease the volume of the ambient noise and increase the volume of the conversation, and to accomplish this goal using a natural gesture. For example, it may be desirable to provide a user with sufficient control to achieve this goal by making the natural gesture in relation to the hearable device, and to avoid the need for the user to use another device (e.g., a smartphone) to provide a control interface to the hearable device for this purpose. In another example, at least a part of apparatus A100 (e.g., acoustic change detector CD100) is located in a wearable device or "wearable," which may be configured to communicate wirelessly with a hearable (e.g., to receive the audio input signal and to send a corresponding volume level command). Examples of wearables include (in addition to hearables) watches, head-mounted displays, headsets, fitness trackers, and pendants.

Figure 2:
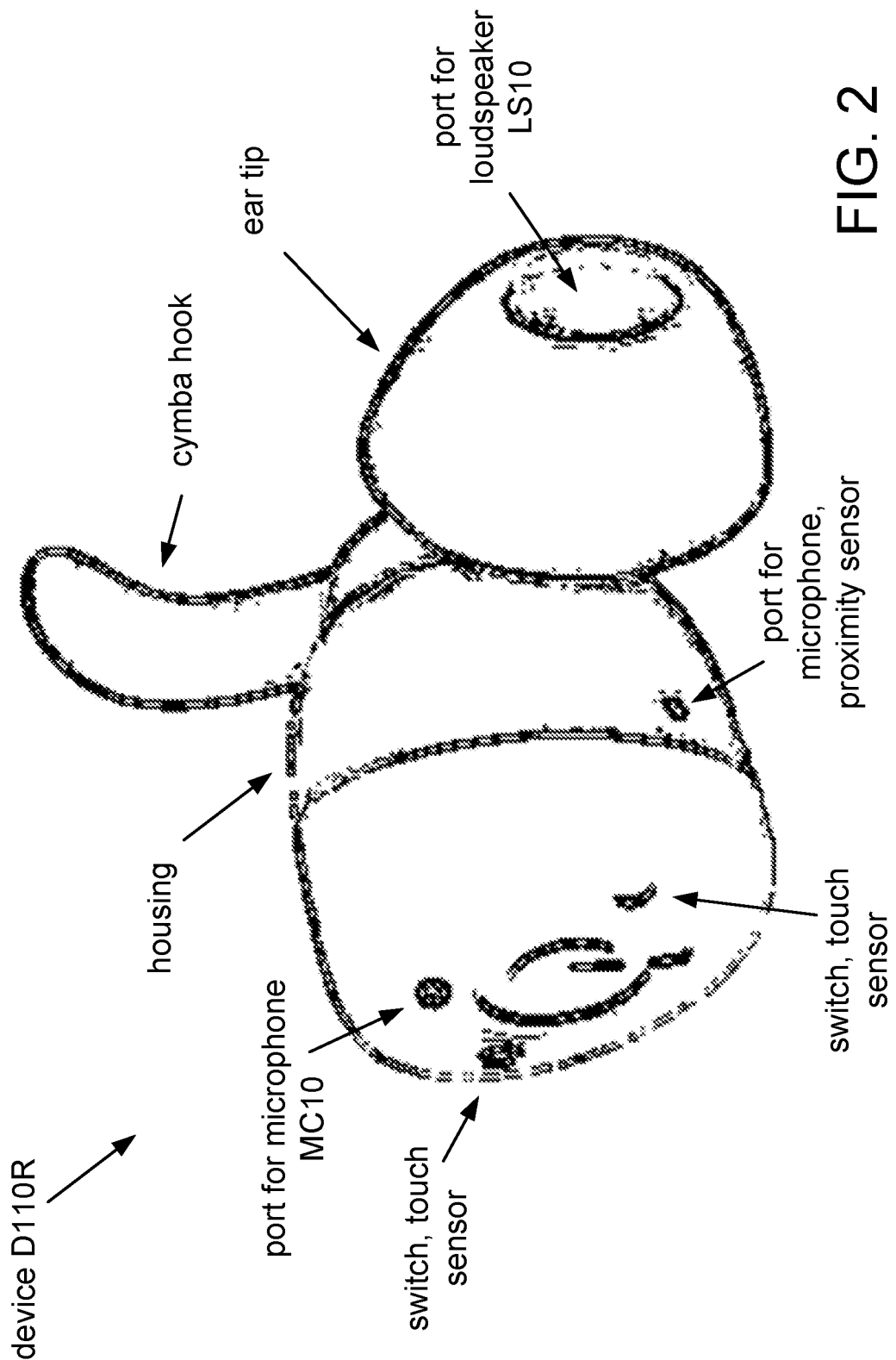
FIG. 2 shows a picture of an implementation D110R of device D100 as a hearable to be worn at a right ear of a user.

FIG. 2 shows a picture of an implementation D110R of device D100 as a hearable to be worn at a right ear of a user. Such a device D110R may include any among a hook or wing to secure the device in the cymba and/or pinna of the ear; an ear tip to provide passive acoustic isolation; one or more switches and/or touch sensors for user control; one or more additional microphones (e.g., to sense an acoustic error signal); and one or more proximity sensors (e.g., to detect that the device is being worn).

Figure 3:
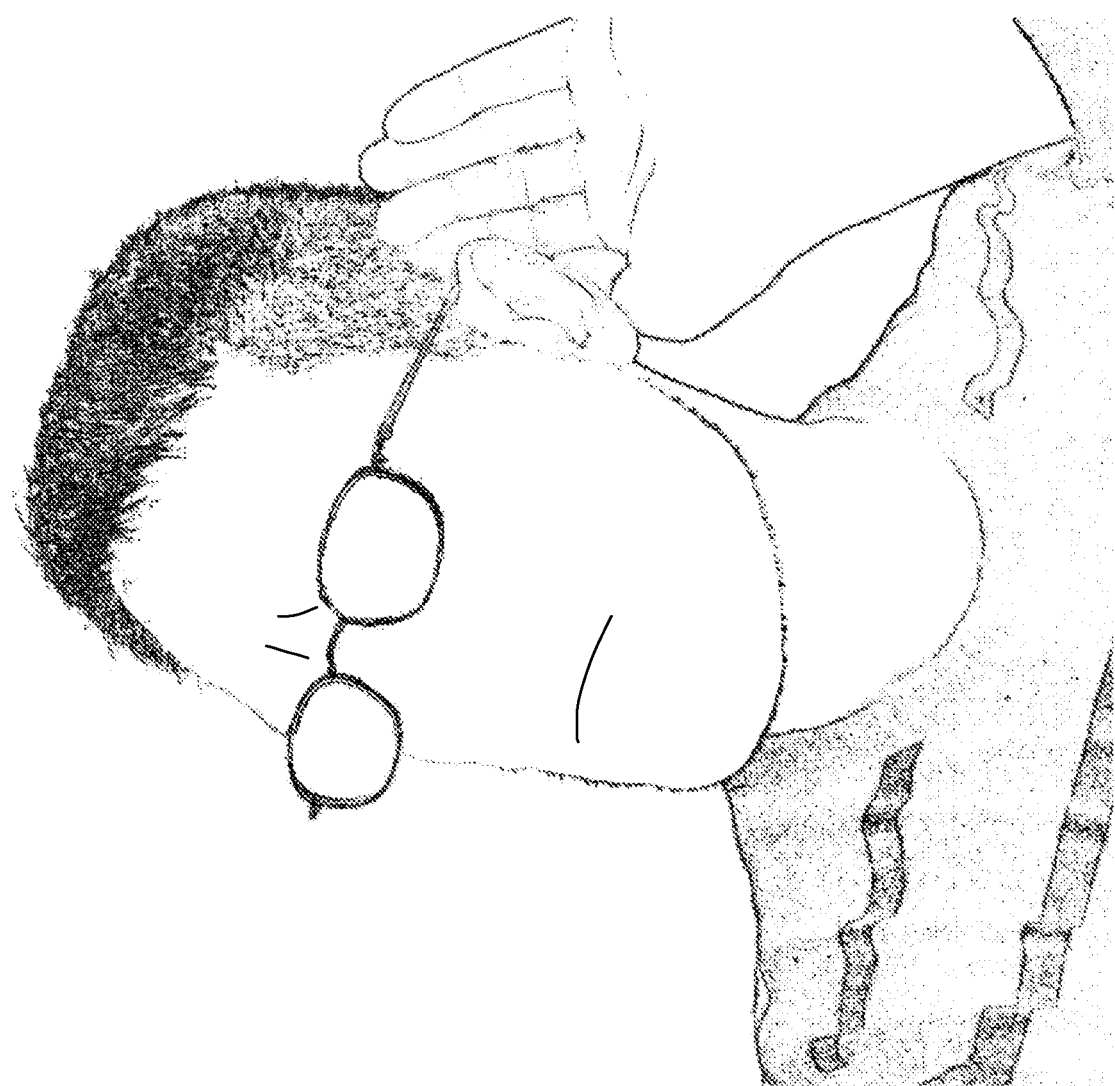
FIG. 3 shows an example of a person having difficulty hearing a desired sound.

The inventors have noted that a person who is having difficulty hearing a desired sound tends to put a hand to one of her ears and may also lean and/or rotate her head toward the direction of the sound source (e.g., as shown in FIG. 3). When the user's hand is covering or half-covering one of her ears, a new acoustic cavity is formed outside that ear. Formation of the new cavity changes the acoustic resonance at the entrance of the ear canal, causing a certain frequency range of the spectrum to be amplified and other frequency components to be attenuated.

When a user holds a hand to her ear, therefore, an abrupt spectrum change may be detected in the output of a microphone at that ear, due to the formation by the hand of the new acoustic cavity (e.g., with the outer ear) having a characteristic resonance. The spectrum change may occur, for example, in a range of about one to about three kilohertz, or a range of about one to about five kilohertz. Acoustic change detector CD100 may be implemented to detect such a change in first audio input signal IS10 by comparing, for example, a current average spectrum over time in the signal and a previous average spectrum over time in the signal to decide if a new acoustic cavity has been formed at the ear.

FIGS. 4A and 4B show two examples of a change in spectrum caused by a user covering her right ear. These plots were recorded from the outer microphones of a pair of hearables worn by a user facing a white-noise point source. In each figure, the solid line shows the spectrum at the left ear, the broken line shows the spectrum at the right ear, the top plot shows the result before the ear is covered, and the bottom plot shows the result after the ear is covered. In FIG. 4A and again in FIG. 4B, an increase of about ten decibels can be seen in the right-ear signal over a range of about one to two kilohertz when the right ear is covered.

Acoustic change detector CD100 may be configured to detect the presence of the object (e.g., the user's hand) by detecting a change in a spectrum of first audio input signal IS10, such as a change in an average spectrum over time. Acoustic change detector CD100 may be configured, for example, to detect a change in energy of one or more detection frequency bands of first audio input signal IS10, relative to energy of one or more one or more control frequency bands of signal IS10 (e.g., the entire spectrum of signal IS10, or the rest of the spectrum of signal IS10). Examples of detection frequency bands include from about one to about two, three, or five kHz.

In one example, acoustic change detector CD100 is configured to calculate the distribution of energy of first audio input signal IS10 with respect to frequency by averaging the power spectral density over time from a series of overlapping fast Fourier transforms (FFTs) or short-time Fourier transforms (STFTs) of the signal. In such case, acoustic change detector CD100 may be configured to calculate the energy in a frequency band of the signal as a sum of the squared magnitudes of the FFT or STFT components in the band. Alternatively, acoustic change detector CD100 may be configured to calculate the energy in a frequency band of the signal in the time domain by using a filter to select the desired frequency band (e.g., a second-order infinite-impulse-response or 'bi-quad' filter) and calculating the energy as a sum of the squared samples of the filter output.

Acoustic change detector CD100 may be configured to detect a change in relative energy by comparing a relation (e.g., a ratio) between detection band energy and control band energy to a threshold value, and such comparing may be repeated at an interval of, for example, 0.1, 0.2, 0.25, 0.4, 0.5, or 1 second. It may be desired to vary one or both of the threshold value and the interval period based on context (e.g., in response to changes in transient signal activity, background signal energy, etc.).

Figure 5B:
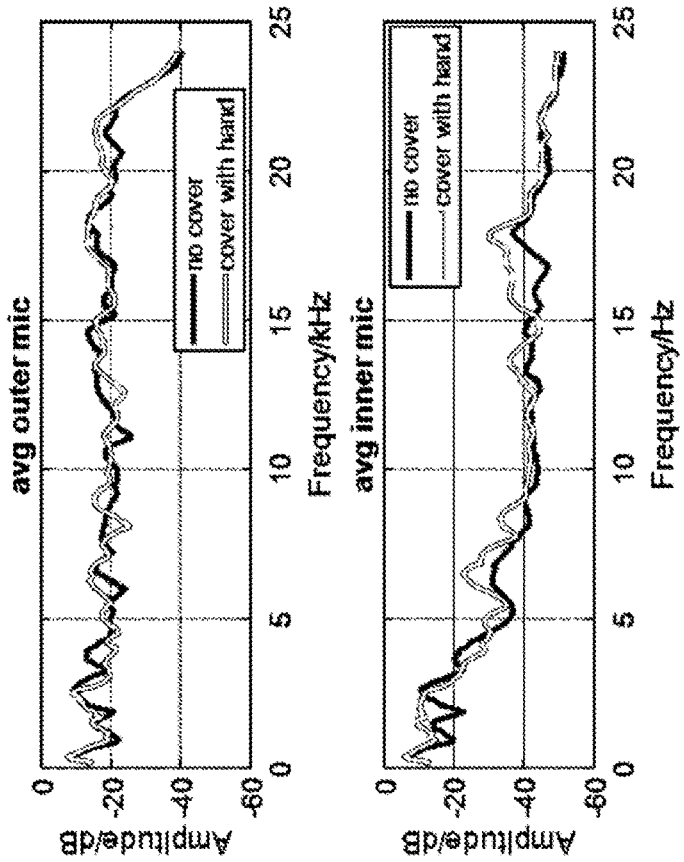
FIGS. 5A and 5B show plots of average spectra of signals from outer and inner microphones of a hearable worn by a user.
Figure 5A:
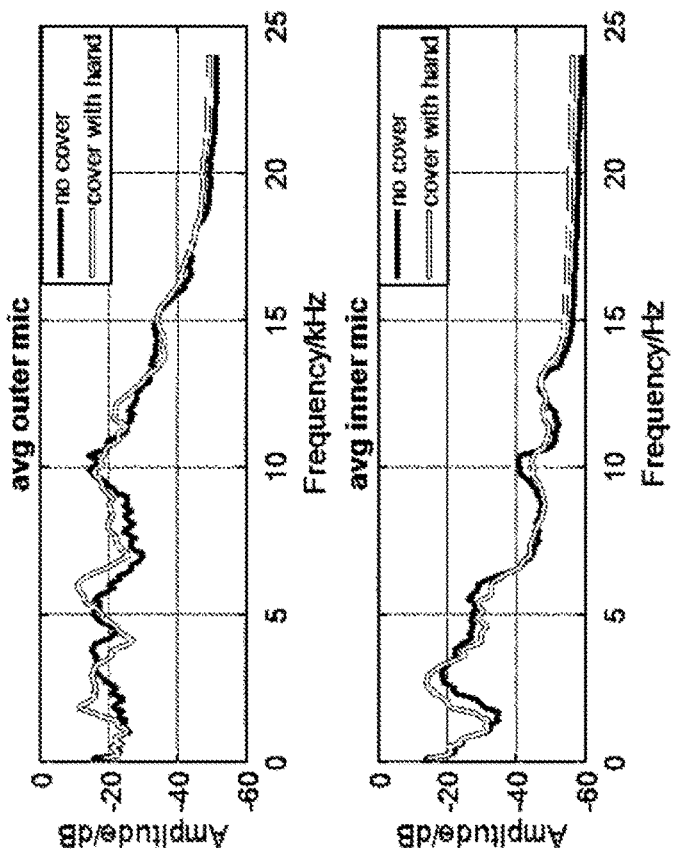

In some cases, a hearable may also be provided with an inner microphone located inside the ear canal. For example, such a microphone may be used to obtain an error signal (e.g., feedback signal) for active noise cancellation (ANC). Acoustic change detector CD100 may be implemented to indicate the presence of the object (e.g., the user's hand) based on a change in spectrum of this signal (additionally or in the alternative to a change in the signal from the outer microphone). FIGS. 5A and 5B show plots of average spectra of signals from outer and inner microphones (top and bottom plots, respectively) of a hearable worn by a user, with the hearable being uncovered (black lines) and covered by the user's hand (white lines). In FIG. 5A, the user is facing a white-noise point source, and the hand gesture causes a spectral change in the signal from the outer microphone that is more pronounced between one and three kHz and also between five to ten kHz. In FIG. 5B, the user is located in a diffuse noise field, and in this case the hand gesture causes a spectral change in the signal from the inner microphone that is more pronounced between five to ten kHz and also between 15 to 18 kHz.

Figure 6B:
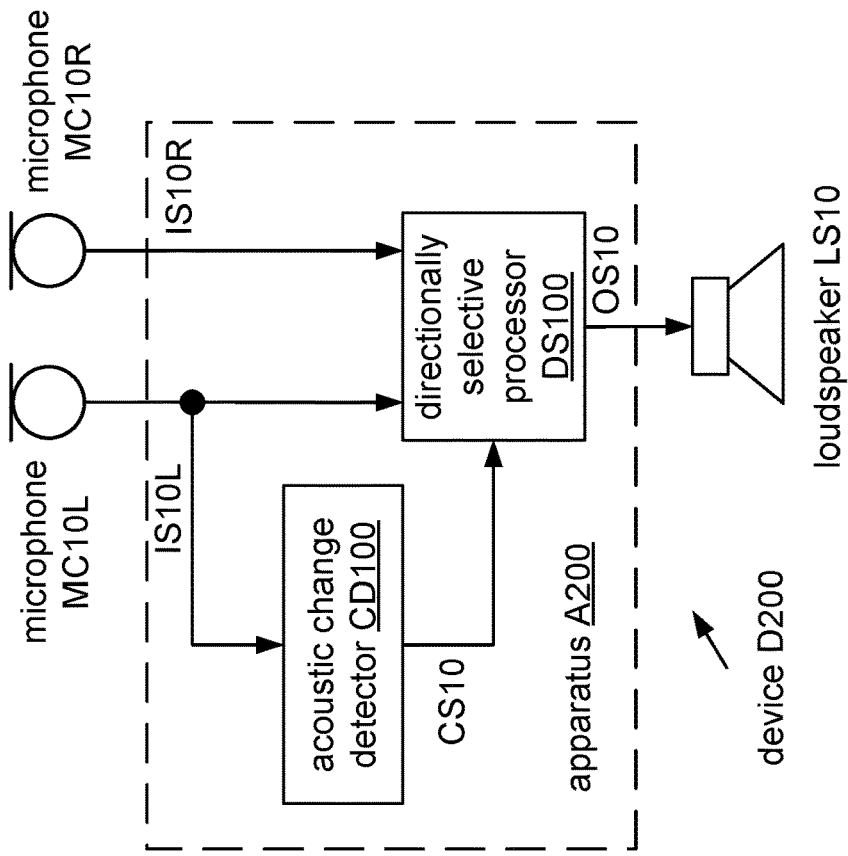
FIG. 6B shows a block diagram of an implementation D200 of device D100 that includes an implementation A200 of apparatus A100.
Figure 6A:
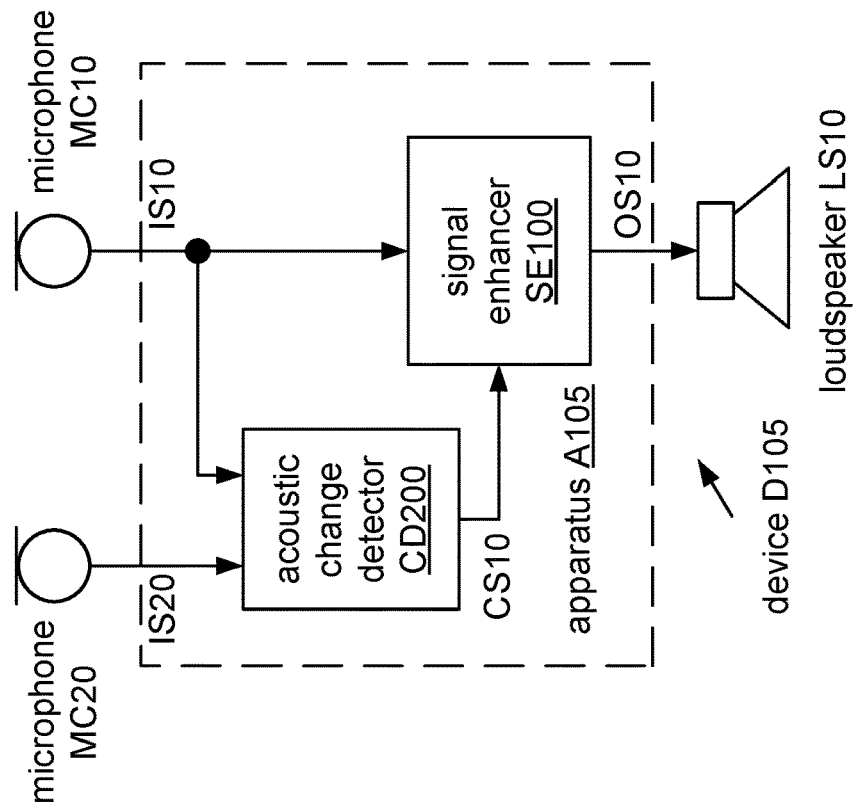
FIG. 6A shows a block diagram of an implementation D105 of device D100 that includes an implementation A105 of apparatus A100 and an inner microphone MC20.

FIG. 6A shows a block diagram of an implementation D105 of device D100 that includes an implementation A105 of apparatus A100 and an inner microphone MC20. Apparatus A105 includes an instance of acoustic change detector CD200 that is arranged to receive an audio input signal IS20 that is based on an output signal of microphone MC20 and to indicate detection of the presence of the object (e.g., the predetermined hand gesture) to an instance of signal enhancer SE100 as described herein with reference to acoustic change detector CD100. Acoustic change detector CD200 may be configured to detect the presence of the object (e.g., that the user has made the predetermined hand gesture) by detecting at least one of a change in a spectrum of first audio input signal IS10 and a change in a spectrum of audio input signal IS20. Acoustic change detector CD200 may be configured to detect a change in a spectrum of first audio input signal IS10 as described above with reference to acoustic change detector CD100, and acoustic change detector CD200 may be configured to detect a change in a spectrum of first audio input signal IS10 in a similar manner (e.g., using a detection frequency band of from about five to about ten kHz and/or from about 15 to 18 kHz). In a further example, acoustic change detector CD200 may be configured to indicate an orientation of the object (e.g., whether the user's hand is cupped around the ear or is covering the ear) based on spectra of signals IS10 and IS20.

The enhancement provided by signal enhancer SE100 may be extended to binaural operation. FIG. 6B shows a block diagram of an implementation D200 of device D100 that includes such an implementation A200 of apparatus A100. In apparatus A200, signal enhancer SE100 is implemented as a directionally selective processor DS100 configured to perform a directionally selective processing operation on a multichannel signal that includes the first audio input signal IS10 (here labeled 'IS10L') and a second audio input signal IS10R (e.g., based on a signal produced by a microphone at the user's other ear). Directionally selective processor DS100 may be implemented as a beamformer, for example, or as a beamformer/nullformer (BFNF). Directionally selective processor DS100 may be configured, for example, to pass or enhance sounds arriving from a direction in which the user is facing (e.g., from a source located away from the user's interaural axis) and/or to block or suppress sounds arriving from either side of the user (e.g., from a source located close to the user's interaural axis).

Figure 7:
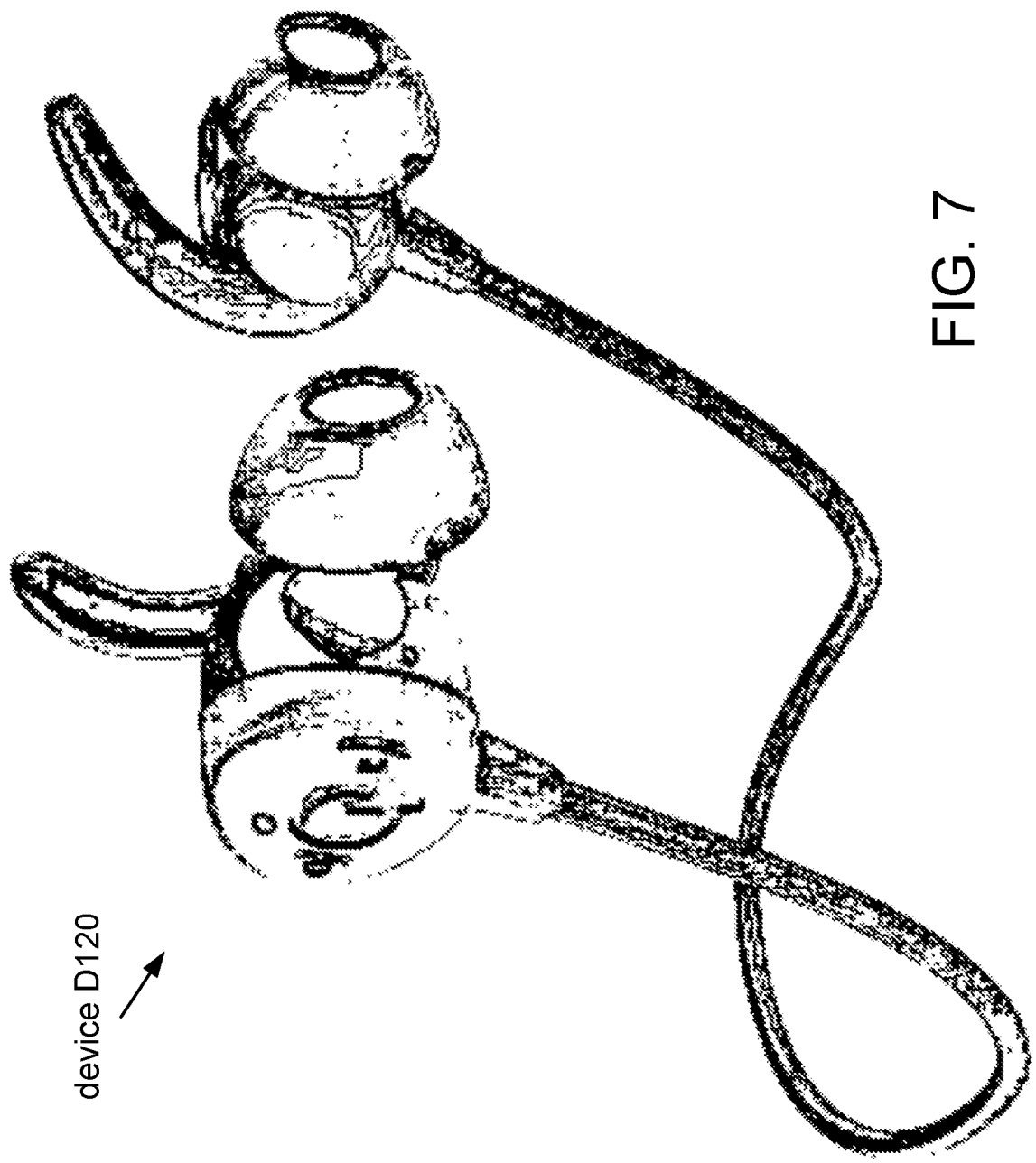
FIG. 7 shows a picture of an implementation D120 of device D100 as a hearable configured to be worn at both ears of a user.

Hearables worn at each ear of a user may be configured to communicate audio and/or control signals to each other wirelessly (e.g., by Bluetooth® (e.g., as specified by the Bluetooth Special Interest Group (SIG), Kirkland, Wash.) or near-field magnetic induction (NFMI)) or by wire. FIG. 7 shows a picture of an implementation D120 of device D100 as a hearable configured to be worn at both ears of a user that includes a corresponding instance of microphone MC10 (MC10L, MC10R) and loudspeaker LS10 (LS10L, LS10R) at each ear.

Figure 8B:
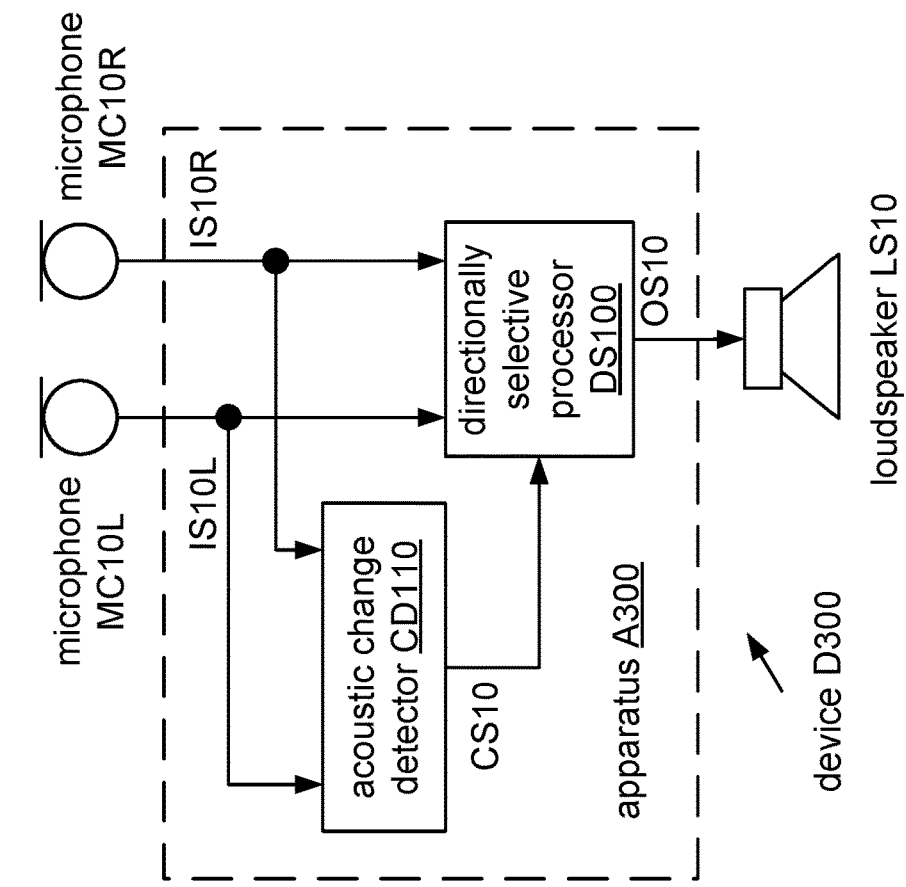
FIG. 8B shows a block diagram of an implementation D300 of device D200 that includes an implementation A300 of apparatus A200.
Figure 8A:
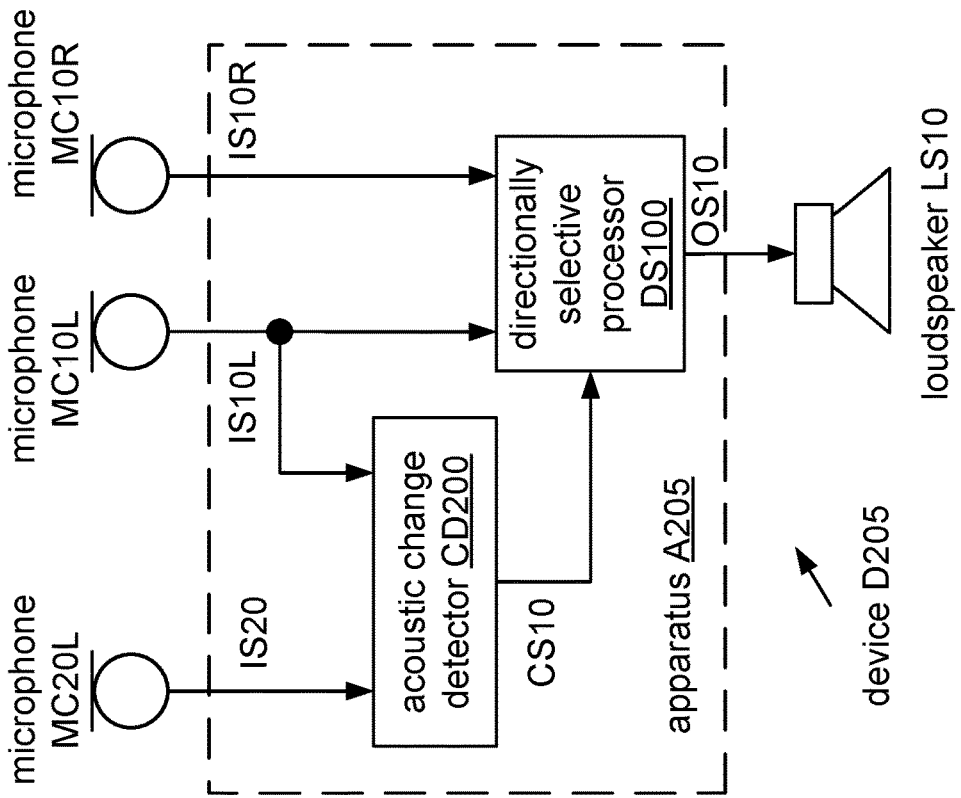
FIG. 8A shows a block diagram of an implementation D205 of devices A105 and D200.

FIG. 8A shows a block diagram of an implementation D205 of devices A105 and D200 that includes a left-ear instance of inner microphone MC20L and an implementation A205 of apparatus A105 and A200.

FIG. 8B shows a block diagram of an implementation D300 of device D200 that includes an implementation A300 of apparatus A200. Apparatus A300 includes an implementation CD110 of acoustic change detector CD100 that receives both left and right audio input signals. Acoustic change detector CD110 may be implemented to detect a change in a spectrum of right-ear signal IS10R (e.g., that a new resonance has been formed at the right ear), for example, by comparing a current average spectrum over time at the left ear and a current average spectrum over time at the right ear, and/or by comparing a current average spectrum over time at the right ear and a previous average spectrum over time at a right ear.

Figure 9B:
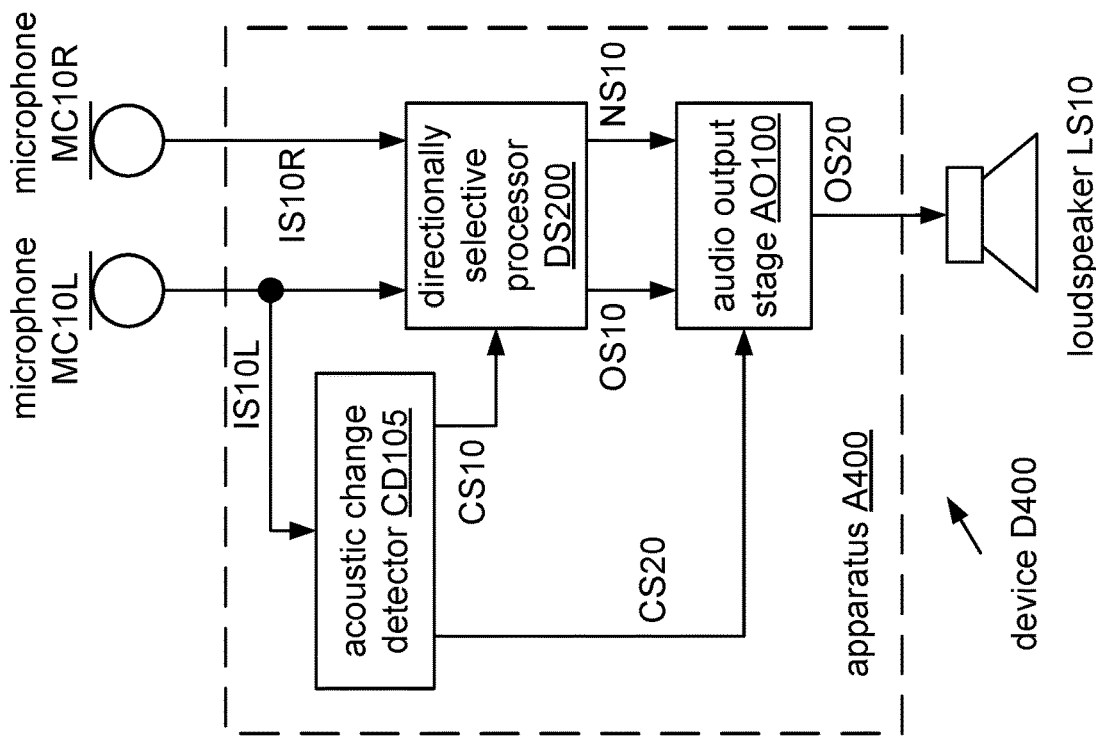
FIG. 9B shows a block diagram of an implementation D400 of device D200 that includes an implementation A400 of apparatus A200.
Figure 9A:
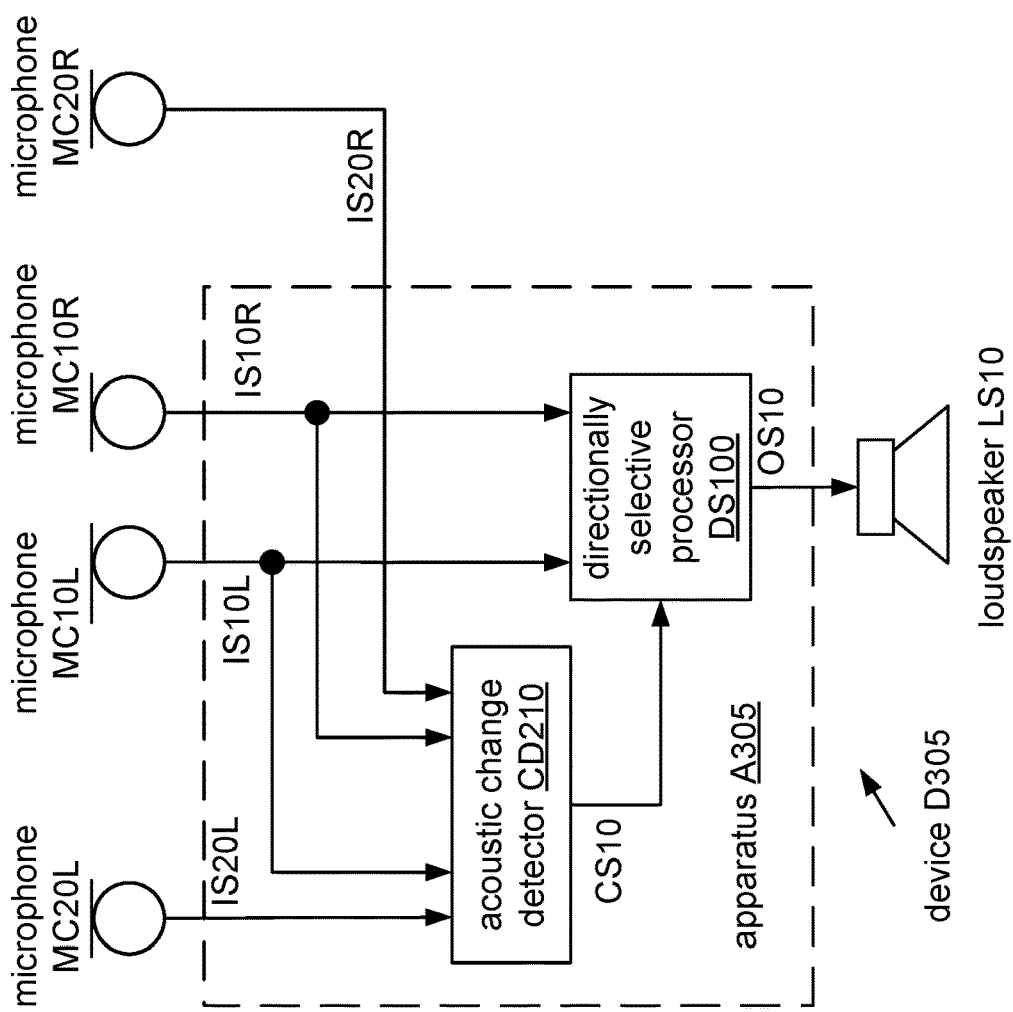
FIG. 9A shows a block diagram of an implementation D305 of devices D105 and D300 that includes an implementation A305 of apparatus A105 and A300.

FIG. 9A shows a block diagram of an implementation D305 of devices D105 and D300 that includes an outer microphone MC10L, MC10R and an inner microphone MC20L, MC20R for each of the user's left and right ears, respectively, and an implementation A305 of apparatus A105 and A300. Apparatus A305 includes an instance of an implementation CD210 of acoustic change detector CD110 and CD200 that is arranged to control an instance of directionally selective processor DS100 as described herein with reference to acoustic change detectors CD110 and CD200.

In order to maintain a natural control interface and/or for the user to continue to hear a desired sound acoustically, it may be desirable to implement acoustic change detector CD100 (including implementations thereof) to detect the control gesture (e.g., a hand held or cupped to the ear) without requiring the user to cover her ear completely. Alternatively or additionally, acoustic change detector CD100 may be implemented to detect a hand fully covering the ear as another control indication that is different from a hand cupped to the ear. Alternatively or additionally, acoustic change detector CD100 may be implemented to detect a gesture made at the left ear as a different control function from a similar gesture made at the right ear.

It may be desirable to provide an initial enrollment session to allow acoustic change detector CD100 to properly identify a control gesture according to the particular acoustic characteristics of the user. Such a session may include a graphical user interface that is linked to the device and instructs the user to repeat each of the desired control gestures (e.g., fully cover the left ear, fully cover the right ear, cup the left ear, cup the right ear) a number of times (e.g., five times each, possibly in a random order) so that the corresponding spectral changes due to resonance may be recorded for each of the control gestures in a manner that is robust to variation in the user's behavior. In another example, the user interface is an audio interface that instructs the user through a loudspeaker of the device. In one example, an implementation of acoustic change detector CD100 (e.g., CD105, CD110, CD150, CD160, CD200, CD210) is configured to include a neural network that is trained using such recorded data.

Such a control interface may be broadly applied to control of any function. In another application, a user may cover her ear or ears to initiate active noise cancellation (ANC) and/or media playback. For example, such an implementation of device D100 may be configured to allow the user to cover both ears to select ANC, and to cover either ear to select media playback (alternatively, to select different media sources by covering the left or right ear). During media playback, such an implementation of device D100 may be further configured to allow the user to cover an ear to skip to the next track or, for example, to cover or hold her left ear to select a "volume up" function and to cover or hold her right ear to select a "volume-down" function.

It may be desirable to configure directionally selective processor DS100 to allow a user to control the degree of selectivity (e.g., the narrowness of the mainlobe of the directional response) according to the duration of time that a corresponding control gesture is maintained. For example, directionally selective processor DS100 may be configured to become increasingly selective over time as control signal CS10 is held in an active state.

Alternatively or additionally, it may be desirable to allow a user to control the degree of relative enhancement (e.g., the relative volume level of the directional component) according to the duration of time that a corresponding control gesture is maintained. In one example, an audio output stage is added for gain and mixing of the output signal produced by directionally selective processor DS100. FIG. 9B shows a block diagram of an implementation D400 of device D200 that includes an implementation DS200 of directionally selective processor DS100, an implementation CD105 of acoustic change detector CD100, and an audio output stage AO100. Directionally selective processor DS200 is implemented to output an output signal OS10 that includes signal components from a selected direction and a noise signal NS10 that includes signal components from non-selected directions. Acoustic change detector CD105 is configured to produce a control signal CS20 to have an active state while the corresponding control gesture is maintained, and audio output stage AO100 is configured to produce an output signal OS20 in which a weight of output signal OS10 relative to a weight of noise signal NS10 increases over time as control signal CS20 is held in the active state.

Figures 10A, 10B:
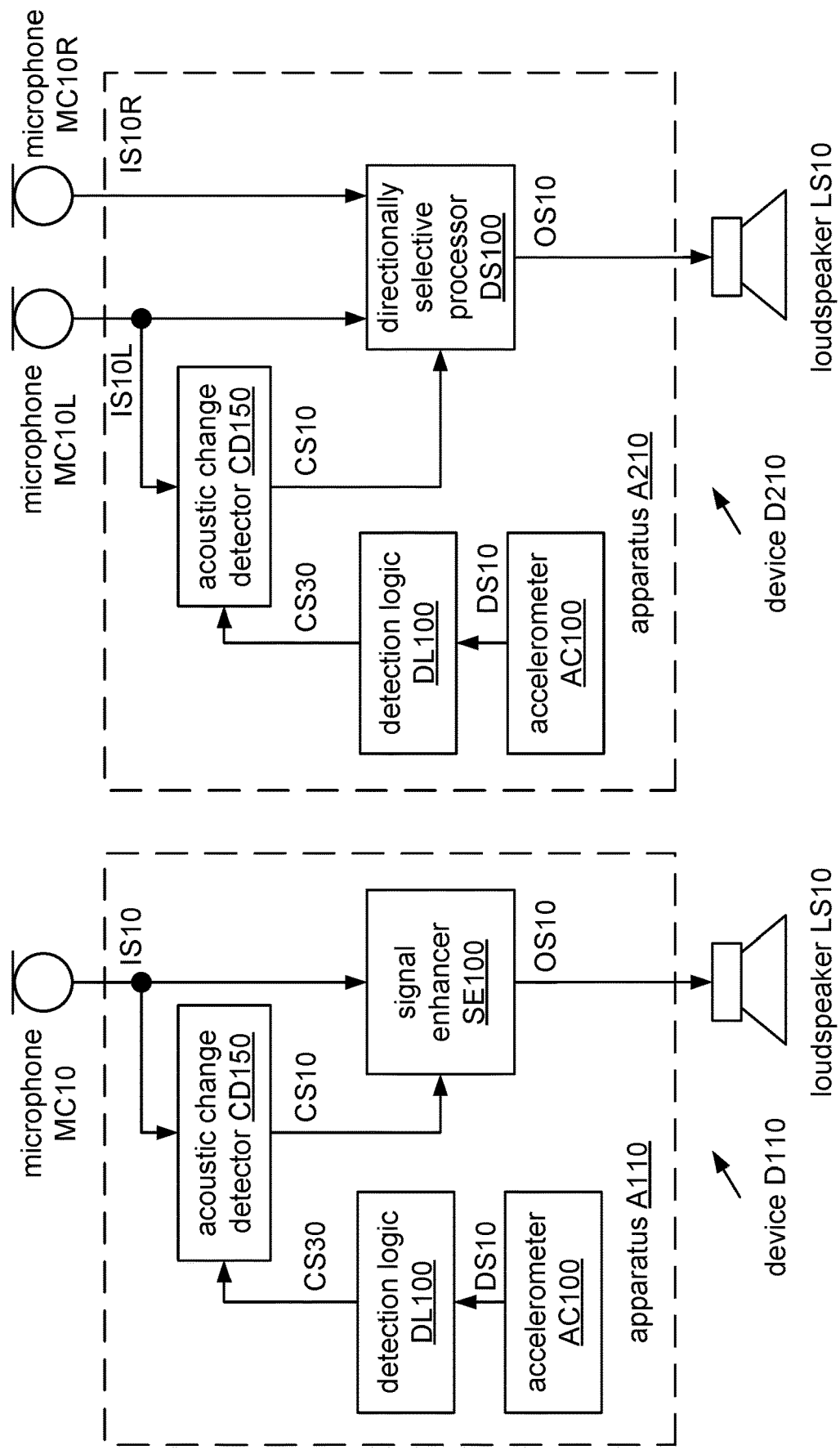
FIG. 10A shows a block diagram of an implementation D110 of device D100 that includes an implementation A110 of apparatus A100.
FIG. 10B shows a block diagram of an implementation D210 of devices D110 and D200.
Figure 11A:
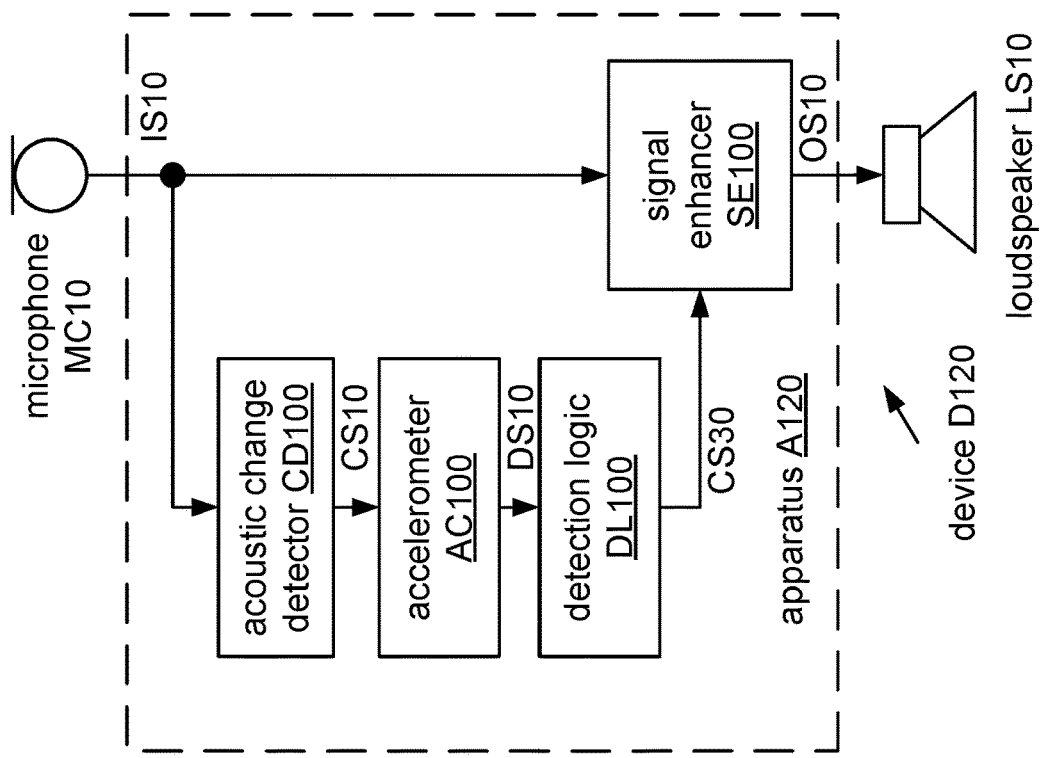
FIG. 11A shows a block diagram of an implementation D310 of devices D110 and D300.

FIG. 10A shows a block diagram of an implementation D110 of device D100 that includes an implementation A110 of apparatus A100. Apparatus A110 includes an accelerometer AC100 which produces a signal DS10 that indicates an acceleration of the apparatus. Apparatus A110 also includes detection logic DL100, which produces a control signal CS30 that indicates the state of a relation between the indicated acceleration and a threshold value, and an implementation CD150 of acoustic change detector CD100 which is activated by an active state of control signal CS30. Such an arrangement may save power of the device by activating signal change detector CD150 only upon detecting that the indicated acceleration exceeds a threshold value. Accelerometer AC100 (which may have one, two, or three axes) may be included in an inertial measurement unit (IMU), which may also include one or more gyroscopes and/or magnetometers. FIG. 10B shows a block diagram of an implementation D210 of devices D110 and D200 that includes an implementation A210 of apparatus A110 and A200, and FIG. 11A shows a block diagram of an implementation D310 of devices D110 and D300 that includes an implementation A310 of apparatus A110 and A300.

Figure 11B:
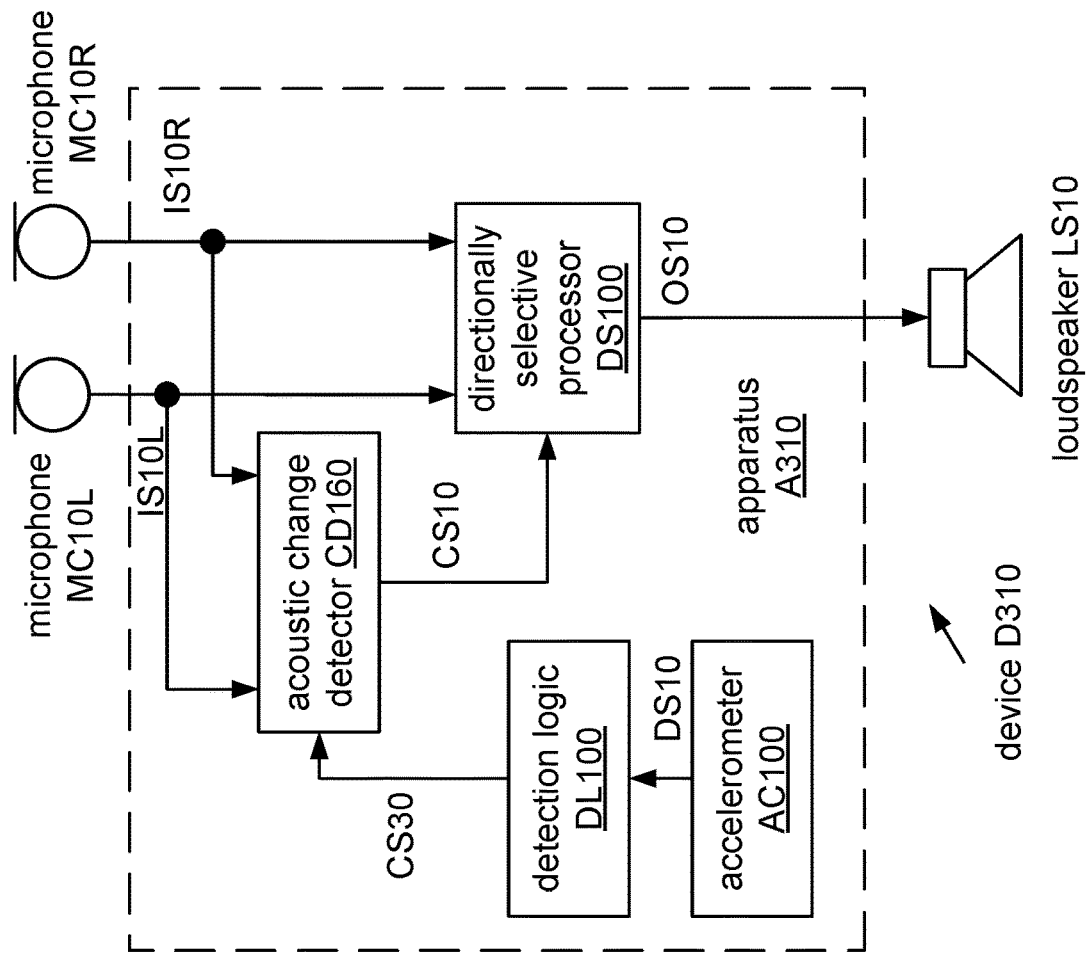
FIG. 11B shows a block diagram of an implementation D120 of device D100 that includes an implementation A120 of apparatus A100.
Figure 12B:
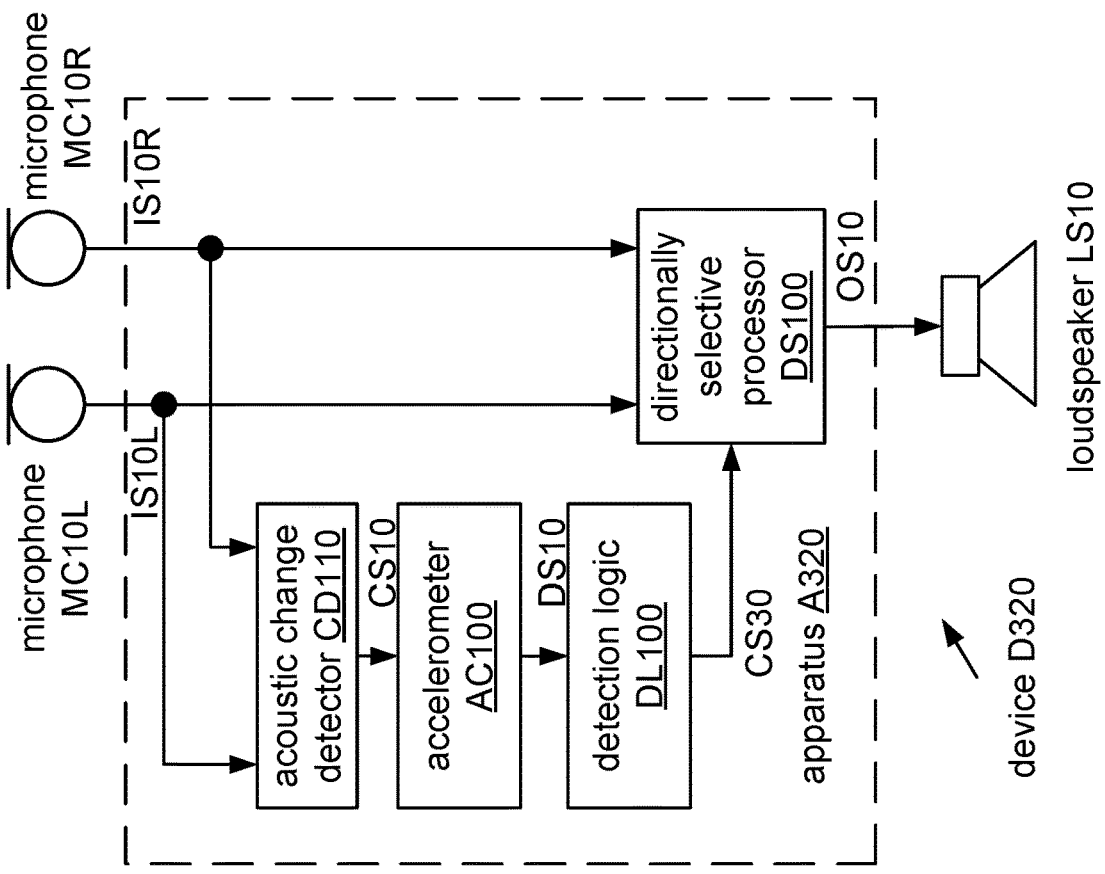
FIG. 12B shows a block diagram of an implementation D320 of device D300 that includes an implementation A320 of apparatus A300.
Figure 12A:
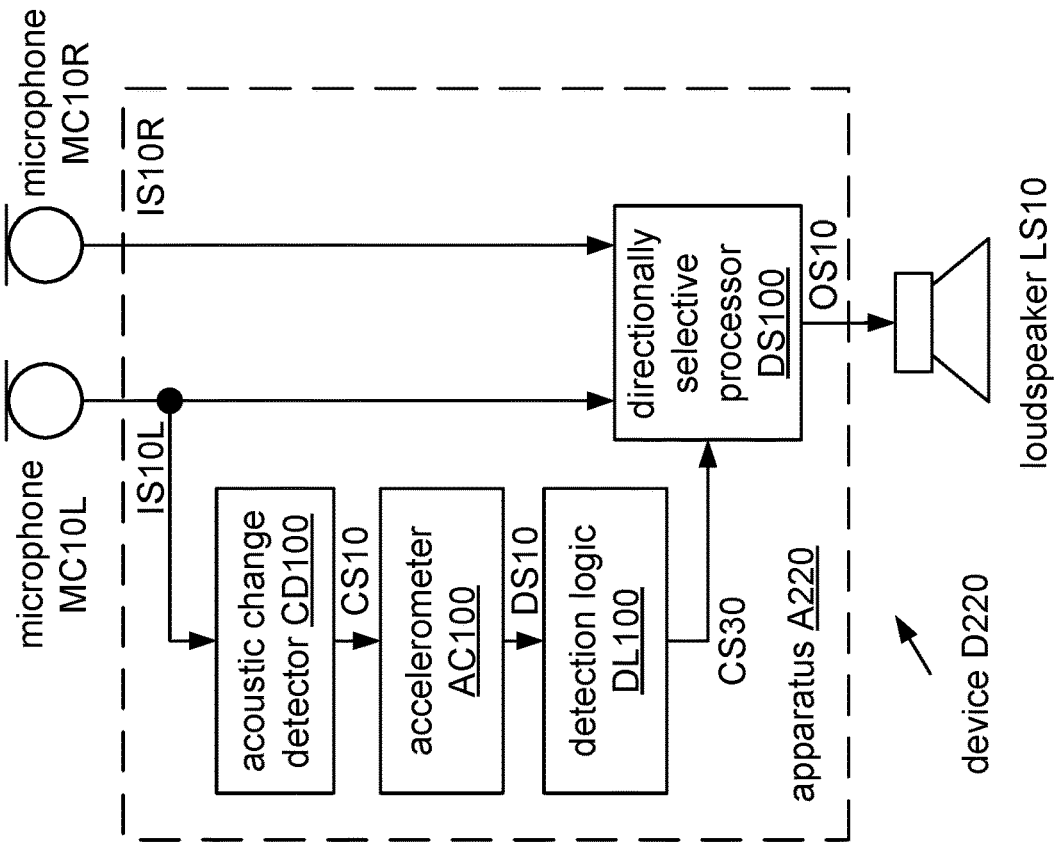
FIG. 12A shows a block diagram of an implementation D220 of device D200 that includes an implementation A220 of apparatus A200.

It is likely that accelerometer AC100 will indicate a meaningful acceleration more frequently than the user will make a predetermined control gesture. Therefore it may be desirable (e.g., to save power) to activate acoustic change detector CD100 less frequently. FIG. 11B shows a block diagram of an implementation D120 of device D100 that includes an implementation A120 of apparatus A100. Apparatus A120 is similar to apparatus A110, except that accelerometer AC100 is activated by control signal CS10 from acoustic change detector CD100, and signal enhancer SE100 is activated by control signal CS30 from detection logic DL100. FIG. 12A shows a block diagram of a similar implementation D220 of device D200, and FIG. 12B shows a block diagram of a similar implementation D320 of device D300. In such devices, accelerometer AC100 and/or detection logic DL100 may be implemented to include a buffer (e.g., a ring buffer or other first-in-first-out (FIFO) buffer) having a capacity approximately equal to, for example, 0.25, 0.5, 1, or 2 seconds to support recognition of a meaningful acceleration event that occurs slightly prior to detection of a corresponding control gesture event.

Figure 13B:
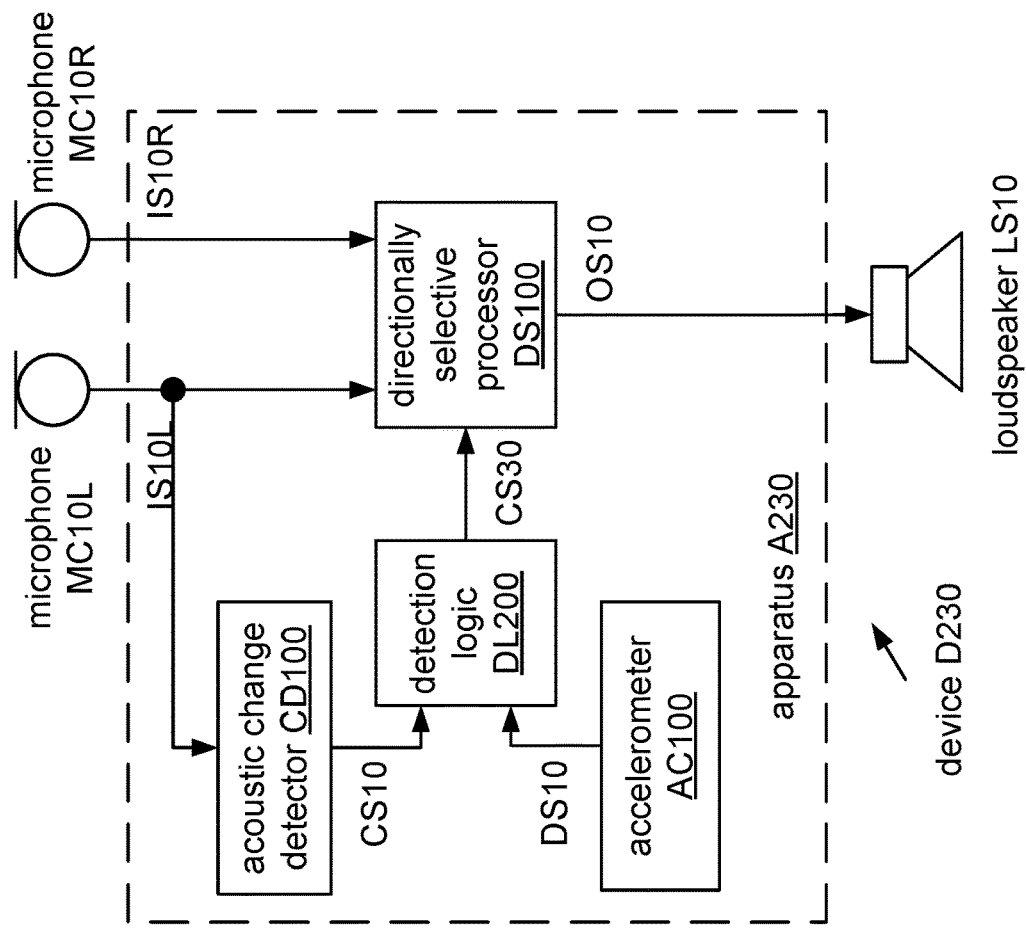
FIG. 13B shows a block diagram of an implementation D230 of device D200 that includes an implementation A230 of apparatus A200.
Figure 13A:
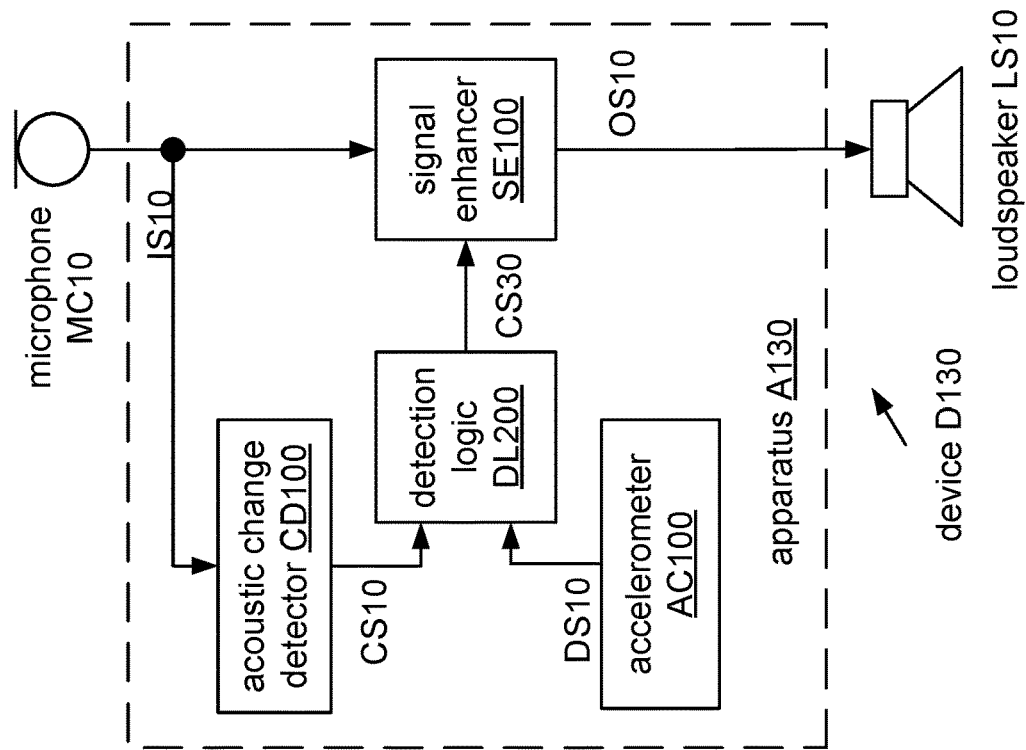
FIG. 13A shows a block diagram of an implementation D130 of device D100 that includes an implementation A130 of apparatus A100.

FIG. 13A shows a block diagram of another implementation D130 of device D100 that includes an implementation A130 of apparatus A100. Apparatus A130 includes an implementation DL200 of detection logic DL100 configured to detect corresponding (e.g., contemporaneous) occurrences of a meaningful acceleration event and a control gesture event. FIG. 13B shows a block diagram of a similar implementation D230 of device D200, and FIG. 14A shows a block diagram of a similar implementation D330 of device D300.

It may be desirable to configure device D100 to identify and execute a desired operation based on a model of the user's behavior. Such a device may be trained on gesture elements as described above and/or trained on broader aspects of the user's behavior. In one example, the training interface may be configured to prompt the user to provide data associating object proximity and acceleration with commands such as: "hold a hand to your ear and move your head as if to indicate trouble hearing a person who is in front of you . . . a person who is to your left . . . a person who is to your right." In one example, an implementation of detection logic DL100 (e.g., DL110, DL200) is configured to include a neural network that is trained using such data.

Figure 15:
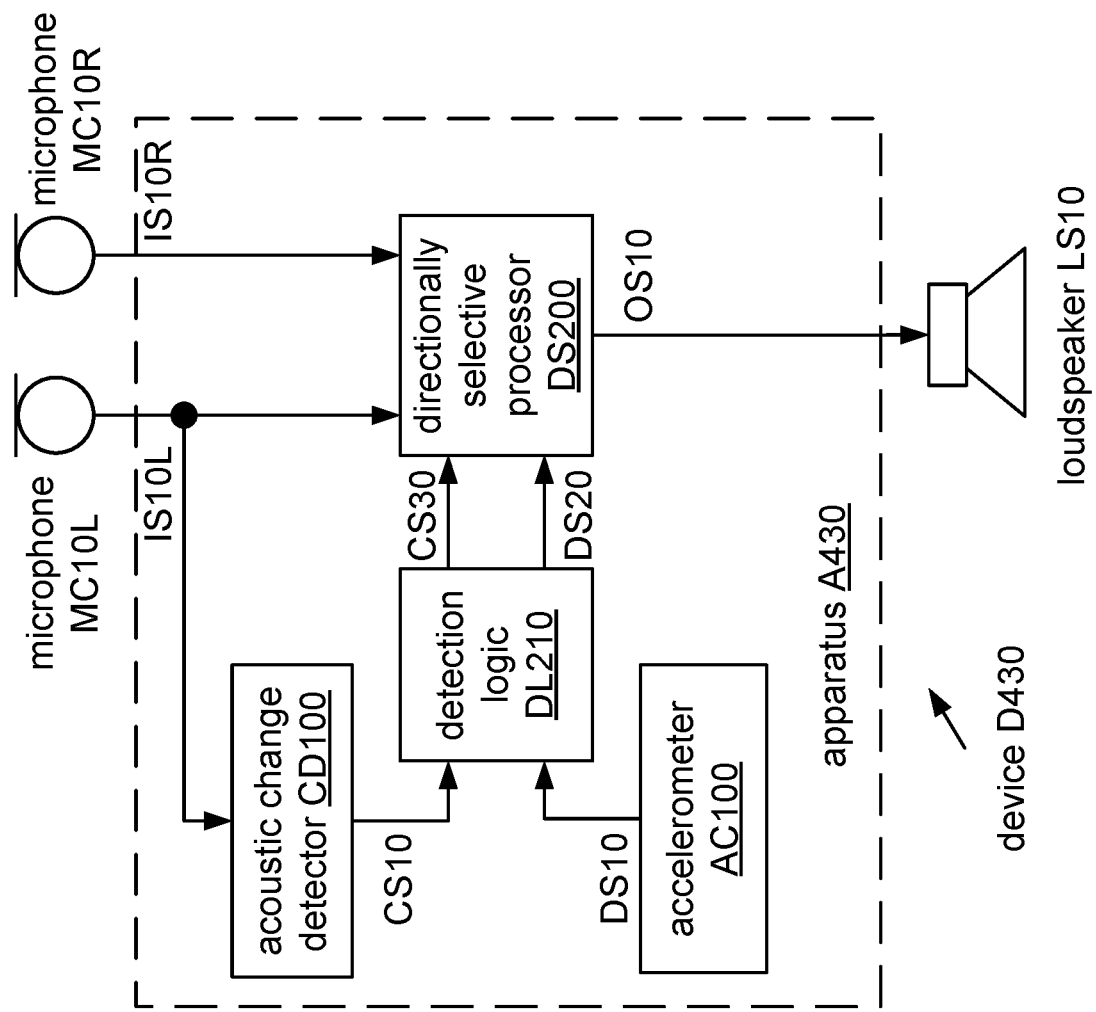
FIG. 15 shows a block diagram of an implementation D430 of device D230 that includes an implementation A430 of apparatus A230.

It may be desirable to control the directionality of sound enhancement and/or suppression based on the output from accelerometer AC100. FIG. 14B shows a block diagram of an implementation D410 of device D210 that includes an implementation A410 of apparatus A210. Apparatus A410 includes an implementation DL110 of detection logic DL100 that is configured to determine, for example, a direction in which acceleration contemporaneous with the gesture has occurred, or a direction associated with an orientation that results when such acceleration ends (e.g., the direction in which the user is facing, a direction of an interaural axis of the user, etc.). For an case in which accelerometer AC100 is part of an IMU, detection logic DL110 may be configured to determine the direction based on outputs of other sensors of the IMU as well (e.g., one or more gyroscopes and/or magnetometers). Apparatus A410 also includes an implementation DS200 of directionally selective processor DS100 that is configured to select a directional component of the multichannel input signal according to a direction indicated by detection logic DL110. Any of apparatus A220, A310, and A320 may be implemented in a similar manner such that detection logic DL100 is implemented as an instance of detection logic DL110 configured to indicate a direction to directionally selective processor DS100 being implemented as an instance of directionally selective processor DS200. FIG. 15 shows a block diagram of an implementation D430 of device D230 that includes a implementation A430 of apparatus A230. Apparatus A430 includes a similar implementation DL210 of detection logic DL110 configured to indicate a direction to an implementation DS200 of directionally selective processor DS100, and apparatus A330 may be implemented in a similar manner.

It may be desirable to implement detection logic DL110 (e.g., DL210) to indicate a direction for enhancement to directionally selective processor DS200 that is different than the determined direction. For example, the indicated direction may be based on a result of training as described above. FIGS. 16A and 16B show an example in which a user having difficulty hearing a speaker who the user is facing (FIG. 16A) initiates enhancement by raising her right hand to her right ear and rotating her head about forty-five degrees to the left (FIG. 16B). In this case, detection logic DL110 (DL210) has been trained to associate such motion by the user to a desired direction of enhancement that is approximately midway between the direction to which the user has turned and the right side of the user's interaural axis. It may be desirable to configure detection logic DL110 (DL210) to continue, after the user has initiated enhancement, to use the output from accelerometer AC100 (and possibly from other sensors of an IMU) to control directionally selective processor DS200 to maintain enhancement toward the desired source even after the user turns her head to another orientation (e.g., to maintain the enhancement toward the speaker that is initiated in FIG. 16B, even after the user turns back to face the speaker as in FIG. 16A).

A wireless connection between hearables worn by different participants in a conversation may be used to allow each such hearable (e.g., a further embodiment of any of the implementations of device D100 described herein) to dynamically estimate a direction of arrival (DoA) and direct-to-reverberation ratio (DRR) for each other participant. The wireless connection may be used to transmit a signal captured by a microphone of one user's hearable to the other users' hearables, where the calculation can be performed (e.g., based on a correlation between speech information carried by the wireless signal and speech information included in a microphone output signal). In such case, if one of the users turns her head to look from one of the other participants to another, the user's hearable detects the change of orientation (e.g., based on an output of accelerometer AC100 and/or outputs of microphones MC10L and MC10R) and substitutes the DoA and DRR corresponding to the new object of the user's attention.

Figure 17B:
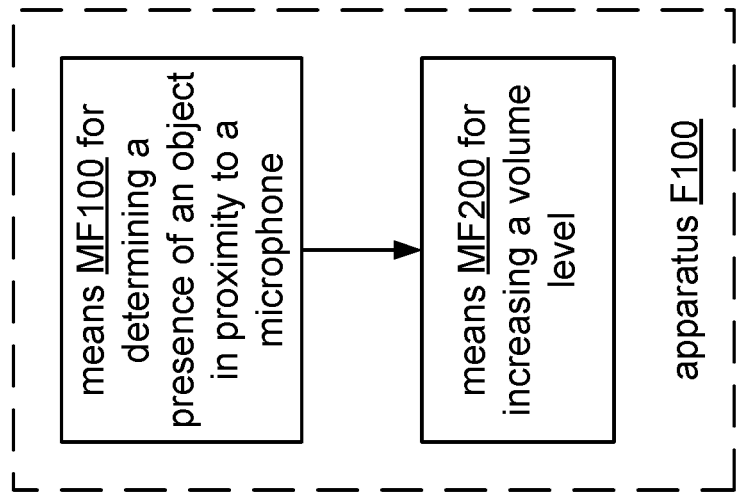
FIG. 17B shows a block diagram of an apparatus for gesture control F100 according to a general configuration.
Figure 17A:
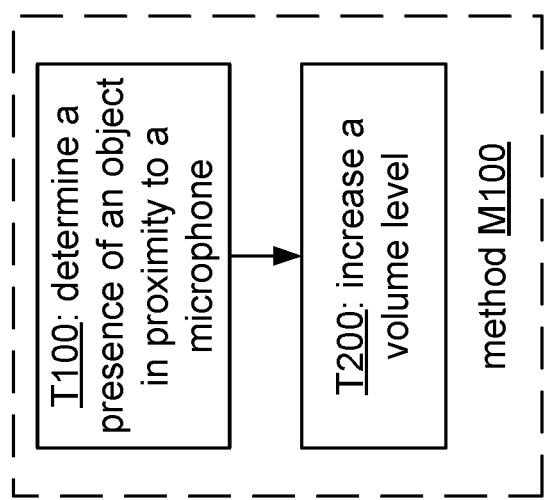
FIG. 17A shows a flowchart of a method of gesture control M100 according to a general configuration.

FIG. 17A shows a flowchart of a method of gesture control M100 according to a general configuration. Method M100 includes a task T100 of determining, based on information from a first audio input signal, a presence of an object in proximity to a microphone (e.g., as described herein with reference to acoustic change detector CD100). The first audio input signal is based on information from a first microphone signal that is produced by a microphone worn at an ear of the user, and the object may be, for example, a hand of the user in a predetermined hand gesture. Method M100 also includes a task T200 of increasing a volume level of a signal that is based on the first microphone signal (e.g., as described herein with reference to signal enhancer SE100). The volume level may be, for example, a relative volume level of a desired component of the signal. For example, task T200 may increase, in response to the determining and relative to a total energy of a source signal that is based on the first audio input signal, an energy of a desired sound component of the source signal.

A method of gesture control of volume level according to another general configuration includes receiving a first audio input signal that is based on an output signal of a first microphone; indicating, based on at least a change in a spectrum of the first audio input signal, a presence of an object in proximity to the first microphone; and in response to the indicating, increasing a volume level (e.g., as described herein with reference to apparatus A100 and implementations thereof). The change in a spectrum of the first audio input signal may be a change over time in an average spectrum of the first audio input signal. The indicating may include indicating an orientation of the object in proximity to the first microphone. The increasing may be based on a duration of the indicating. Such a method may further comprise any one or more of the following: detecting that an indicated acceleration is not less than a threshold value, wherein the increasing a volume level occurs in response to the detecting; receiving a second audio input signal that is based on an output signal of a second microphone, wherein the indicating is based on a difference between the first audio input signal and the second audio input signal; receiving a second audio input signal that is based on an output signal of a second microphone and reproducing a signal that is based on the output signals of the first and second microphones; receiving a second audio input signal that is based on an output signal of a second microphone, wherein the volume level is a volume level of a multichannel signal in a selected direction and wherein the multichannel signal is based on the output signals of the first and second microphones (in which case the method may further comprise indicating a direction associated with an indicated acceleration, wherein the selected direction is based on the indicated direction). Implementations include code (e.g., stored in a non-transitory computer-readable storage medium) which, when executed by at least one processor, causes the at least one processor to perform a method of gesture control as in any of these examples.

FIG. 17B shows a block diagram of an apparatus F100 according to a general configuration that includes means MF100 for indicating, based on information from a first audio input signal, a presence of an object in proximity to a microphone (e.g., as described herein with reference to acoustic change detector CD100). The first audio input signal is based on information from a first microphone signal that is produced by a microphone worn at an ear of the user, and the object may be, for example, a hand of the user in a predetermined hand gesture. Apparatus F100 also includes means MF200 for increasing a volume level of a signal that is based on the first microphone signal (e.g., as described herein with reference to signal enhancer SE100). The volume level may be, for example, a relative volume level of a desired component of the signal. For example, means MF200 may increase, relative to a total energy of a source signal that is based on the first audio input signal, and in response to the indicating, an energy of a desired sound component of the source signal (e.g., as described herein with reference to signal enhancer SE100).

An apparatus for gesture control of volume level according to another general configuration includes means for producing a first audio input signal that is based on an output signal of a first microphone; means for indicating, based on at least a change in a spectrum of the first audio input signal, a presence of an object in proximity to the first microphone (e.g., as described herein with reference to acoustic change detector CD100 and implementations thereof); and means for increasing a volume level in response to the indicating (e.g., as described herein with reference to signal enhancer SE100 and implementations thereof). The means for producing may include one or more passive and/or active components to produce the audio input signal from the corresponding microphone output signal by performing any one or more of operations such as impedance matching, filtering, amplification, and/or equalization. In some implementations, the means for producing may be located at least in part within a housing of the microphone.

The change in a spectrum of the first audio input signal may be a change over time in an average spectrum of the first audio input signal. The indicating may include indicating an orientation of the object in proximity to the first microphone. The increasing may be based on a duration of the indicating. Such an apparatus may further comprise any one or more of the following: means for detecting that an indicated acceleration is not less than a threshold value, wherein the increasing a volume level occurs in response to the detecting; means for producing a second audio input signal that is based on an output signal of a second microphone, wherein the indicating is based on a difference between the first audio input signal and the second audio input signal; means for producing a second audio input signal that is based on an output signal of a second microphone and means for reproducing a signal that is based on the output signals of the first and second microphones; means for producing a second audio input signal that is based on an output signal of a second microphone, wherein the volume level is a volume level of a multichannel signal in a selected direction and wherein the multichannel signal is based on the output signals of the first and second microphones (in which case the apparatus may further comprise means for indicating a direction associated with an indicated acceleration, wherein the selected direction is based on the indicated direction).

The various elements of an implementation of an apparatus or system as disclosed herein (e.g., apparatus A100 and F100 and implementations thereof) may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 or M200 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A wearable for gesture control of volume level, the wearable comprising:
a memory configured to store a first audio input signal that is based on an output signal of a first microphone; and
a processor coupled to the memory and configured to:
detect that an acceleration indicated by an accelerometer is not less than a threshold value;
receive the first audio input signal;
indicate, based on at least a change in a spectrum of the first audio input signal, a presence of an object in proximity to the first microphone; and
in response to the detecting and the indicating, increase a volume level of the wearable.

2. The wearable according to claim 1, wherein the change in a spectrum of the first audio input signal is a change in an average spectrum of the first audio signal over time.

3. The wearable according to claim 1, wherein the wearable is a hearable that includes the first microphone.

4. The wearable according to claim 1, wherein the indicating includes indicating an orientation of the object in proximity to the first microphone.

5. The wearable according to claim 1, wherein the increasing is based on a duration of the indicating.

6. The wearable according to claim 1, wherein the processor is configured to receive a second audio input signal that is based on an output signal of a second microphone, and
wherein the volume level is a volume level of a multichannel signal in a selected direction, and
wherein the multichannel signal is based on the output signals of the first and second microphones.

7. The wearable according to claim 6, wherein the processor is configured to indicate a direction associated with the indicated acceleration, and
wherein the selected direction is based on the indicated direction.

8. The wearable according to claim 1, wherein the processor is configured to receive a second audio input signal that is based on an output signal of a second microphone, and
wherein the indicating is based on a difference between the first audio input signal and the second audio input signal.

9. The wearable according to claim 1, wherein the processor is configured to receive a second audio input signal that is based on an output signal of a second microphone, and
wherein the wearable is a hearable that includes the first microphone and a loudspeaker configured to reproduce a signal that is based on the output signals of the first and second microphones.

10. A method of gesture control of volume level, the method comprising:
receiving a first audio input signal that is based on an output signal of a first microphone;
detecting that an indicated acceleration is not less than a threshold value;
indicating, based on at least a change in a spectrum of the first audio input signal, a presence of an object in proximity to the first microphone; and
in response to the detecting and the indicating, increasing a volume level.

11. The method according to claim 10, wherein the change in a spectrum of the first audio input signal is a change over time in an average spectrum of the first audio input signal.

12. The method according to claim 10, wherein the indicating includes indicating an orientation of the object in proximity to the first microphone.

13. The method according to claim 10, wherein the increasing is based on a duration of the indicating.

14. The method according to claim 10, wherein the method comprises receiving a second audio input signal that is based on an output signal of a second microphone, and
wherein the volume level is a volume level of a multichannel signal in a selected direction, and
wherein the multichannel signal is based on the output signals of the first and second microphones.

15. The method according to claim 14, the method further comprising indicating a direction associated with the indicated acceleration,
wherein the selected direction is based on the indicated direction.

16. The method according to claim 10, the method further comprising receiving a second audio input signal that is based on an output signal of a second microphone,
wherein the indicating is based on a difference between the first audio input signal and the second audio input signal.

17. The method according to claim 10, the method further comprising:
receiving a second audio input signal that is based on an output signal of a second microphone, and
reproducing a signal that is based on the output signals of the first and second microphones.

18. An apparatus for gesture control of volume level, the apparatus comprising:
means for producing a first audio input signal that is based on an output signal of a first microphone;
means for detecting that an indicated acceleration is not less than a threshold value;
means for indicating, based on at least a change in a spectrum of the first audio input signal, a presence of an object in proximity to the first microphone; and
means for increasing a volume level in response to the detecting and the indicating.

19. A non-transitory computer-readable storage medium storing computer-executable instructions, which when executed by one or more processors, cause the one or more processors to execute a method of gesture control of volume level, the method comprising:
receiving a first audio input signal that is based on an output signal of a first microphone;
detecting that an indicated acceleration is not less than a threshold value;
indicating, based on at least a change in a spectrum of the first audio input signal, a presence of an object in proximity to the first microphone; and
in response to the detecting and the indicating, increasing a volume level.

20. The wearable according to claim 8, wherein the first microphone is oriented in a first direction, and wherein the second microphone is oriented in a second direction that is different than the first direction.

21. The method according to claim 16, wherein the first microphone is oriented in a first direction, and wherein the second microphone is oriented in a second direction that is different than the first direction.

* * * * *